US012621688B2

(12) United States Patent
Rydén et al.

(10) Patent No.: US 12,621,688 B2
(45) Date of Patent: May 5, 2026

(54) NETWORK NODE, USER EQUIPMENT AND METHODS FOR HANDLING SIGNAL QUALITY VARIATIONS

(71) Applicant: Telefonaktiebolaget LM Ericsson (PUBL), Stockholm (SE)

(72) Inventors: Henrik Rydén, Stockholm (SE); Wei Shen, Linköping (SE); Ali Parichehrehteroujeni, Linköping (SE); Pradeepa Ramachandra, Linköping (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 556 days.

(21) Appl. No.: 17/595,004

(22) PCT Filed: May 9, 2019

(86) PCT No.: PCT/SE2019/050411
§ 371 (c)(1),
(2) Date: Nov. 5, 2021

(87) PCT Pub. No.: WO2020/226542
PCT Pub. Date: Nov. 12, 2020

(65) Prior Publication Data
US 2022/0217556 A1 Jul. 7, 2022

(51) Int. Cl.
*H04W 24/08* (2009.01)
*H04B 17/318* (2015.01)
*H04W 36/00* (2009.01)

(52) U.S. Cl.
CPC .......... *H04W 24/08* (2013.01); *H04B 17/328* (2023.05); *H04W 36/008375* (2023.05)

(58) Field of Classification Search
CPC .................................................. H04W 24/08
See application file for complete search history.

(56) References Cited

U.S. PATENT DOCUMENTS 8,948,779 B1 2/2015 Choi et al.
9,693,276 B1 * 6/2017 Wuellner ................ H04L 41/00
(Continued)

FOREIGN PATENT DOCUMENTS

CN 105432118 A 3/2016
EP 2 819 331 A1 12/2014
(Continued)

OTHER PUBLICATIONS

First Office Action Notification issued for Chinese Application No. 201980096236—Sep. 5, 2023.
(Continued)

*Primary Examiner* — Abdeltif Ajid
(74) *Attorney, Agent, or Firm* — Baker Botts L.L.P.

(57) ABSTRACT

Embodiments herein relate to a method performed by a network node (110) for handling signal quality variations for a UE (120). The network node (110) predicts a future signal quality variation indicative of a path of movement for a second UE (120*b*) being served by the network node (110). The predicting is based on historical data of previous signal quality variations for one or more first UEs (120*a*) having been served by the network node (110). The historical data of previous signal quality variations is indicative of a path of movement of the one or more first UEs (120*a*). The network node (110) determines to change a network configuration for the second UE (120*b*) based on the predicted signal quality variation. The network node (110) initiates the change of the network configuration for the second UE (120*b*). Embodiments herein further relate to a method performed by a UE (120*a*, 120*b*) for handling signal quality variations for the UE (120*a*, 120*b*).

20 Claims, 20 Drawing Sheets

(56) References Cited

U.S. PATENT DOCUMENTS

| | | | | |
|---|---|---|---|---|
| 11,032,751 | B2 * | 6/2021 | Arur | H04B 7/195 |
| 12,184,476 | B2 * | 12/2024 | Luo | H04L 5/0048 |
| 2002/0131386 | A1 * | 9/2002 | Gwon | H04L 67/04 |
| | | | | 370/338 |
| 2013/0053025 | A1 * | 2/2013 | Lindoff | H04W 36/0088 |
| | | | | 455/437 |
| 2013/0295951 | A1 * | 11/2013 | Mach | H04W 36/324 |
| | | | | 455/517 |
| 2013/0308481 | A1 * | 11/2013 | Kazmi | H04W 24/02 |
| | | | | 370/252 |
| 2014/0094208 | A1 | 4/2014 | Egner et al. | |
| 2015/0038140 | A1 | 2/2015 | Kilpatrick, II et al. | |
| 2015/0085829 | A1 * | 3/2015 | Bawaskar | H04W 36/0085 |
| | | | | 370/332 |
| 2016/0044692 | A1 * | 2/2016 | Egner | H04L 5/006 |
| | | | | 370/330 |
| 2016/0183182 | A1 * | 6/2016 | Jain | H04W 72/0453 |
| | | | | 370/329 |
| 2018/0152875 | A1 | 5/2018 | Kapoulas et al. | |
| 2018/0368009 | A1 | 12/2018 | Xia et al. | |
| 2019/0289505 | A1 * | 9/2019 | Thomas | H04W 36/32 |
| 2021/0027182 | A1 * | 1/2021 | Harris | G06N 20/20 |
| 2021/0105172 | A1 * | 4/2021 | Luo | H04W 76/19 |

FOREIGN PATENT DOCUMENTS

| | | | | | |
|---|---|---|---|---|---|
| EP | 2819331 | B1 * | 8/2018 | | H04H 20/26 |
| WO | WO-2013066120 | A1 * | 5/2013 | | H04W 36/32 |
| WO | 2016 058648 | A1 | 4/2016 | | |

OTHER PUBLICATIONS

Search Report issued for Chinese Application No. 2019800962360—Sep. 4, 2023.

European Search Report issued for Application No./Patent No. 19928265.8-1216 / 3966971—Apr. 19, 2022.

3GPP TS 36.133 v15.5.0; Technical Specification; 3rd Generation Partnership Project; Technical Specification Group Radio Access Network; Evolved Universal Terrestrial Radio Access (E-UTRA); Requirements for support of radio resource management (Release 15) (due to size, this reference has been split into five parts)—Dec. 2018.

3GPP TS 36.304 v15.2.0; Technical Specification; 3rd Generation Partnership Project; Technical Specification Group Radio Access Network; Evolved Universal Terrestrial Radio Access (E-UTRA); User Equipment (UE) procedures in idle mode (Release 15)—Dec. 2018.

3GPP TS 38.133 v15.4.0; Technical Specification; 3rd Generation Partnership Project; Technical Specification Group Radio Access Network; NR; Requirements for support of radio resource management (Release 15)—Dec. 2018.

3GPP TS 38.304 v15.2.0; Technical Specification; 3rd Generation Partnership Project; Technical Specification Group Radio Access Network; NR; User Equipment (UE) procedures in Idle mode and RRC Inactive state (Release 15)—Dec. 2018.

PCT International Search Report issued for International application No. PCT/SE2019/050411—Feb. 20, 2020.

PCT Written Opinion of the International Searching Authority issued for International application No. PCT/SE2019/050411—Feb. 20, 2020.

* cited by examiner

110

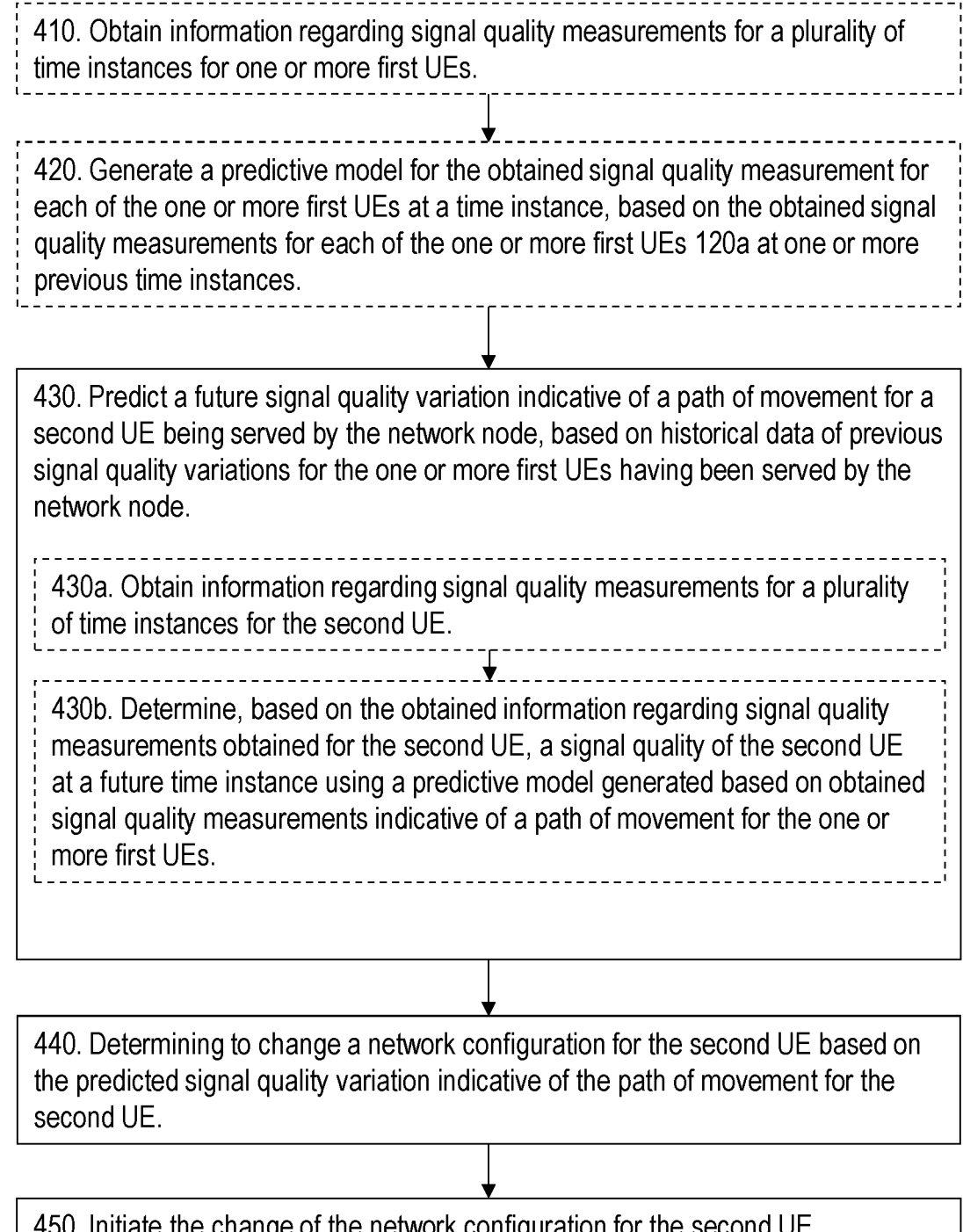

410. Obtain information regarding signal quality measurements for a plurality of time instances for one or more first UEs.

420. Generate a predictive model for the obtained signal quality measurement for each of the one or more first UEs at a time instance, based on the obtained signal quality measurements for each of the one or more first UEs 120a at one or more previous time instances.

430. Predict a future signal quality variation indicative of a path of movement for a second UE being served by the network node, based on historical data of previous signal quality variations for the one or more first UEs having been served by the network node.

430a. Obtain information regarding signal quality measurements for a plurality of time instances for the second UE.

430b. Determine, based on the obtained information regarding signal quality measurements obtained for the second UE, a signal quality of the second UE at a future time instance using a predictive model generated based on obtained signal quality measurements indicative of a path of movement for the one or more first UEs.

440. Determining to change a network configuration for the second UE based on the predicted signal quality variation indicative of the path of movement for the second UE.

450. Initiate the change of the network configuration for the second UE.

Fig. 4

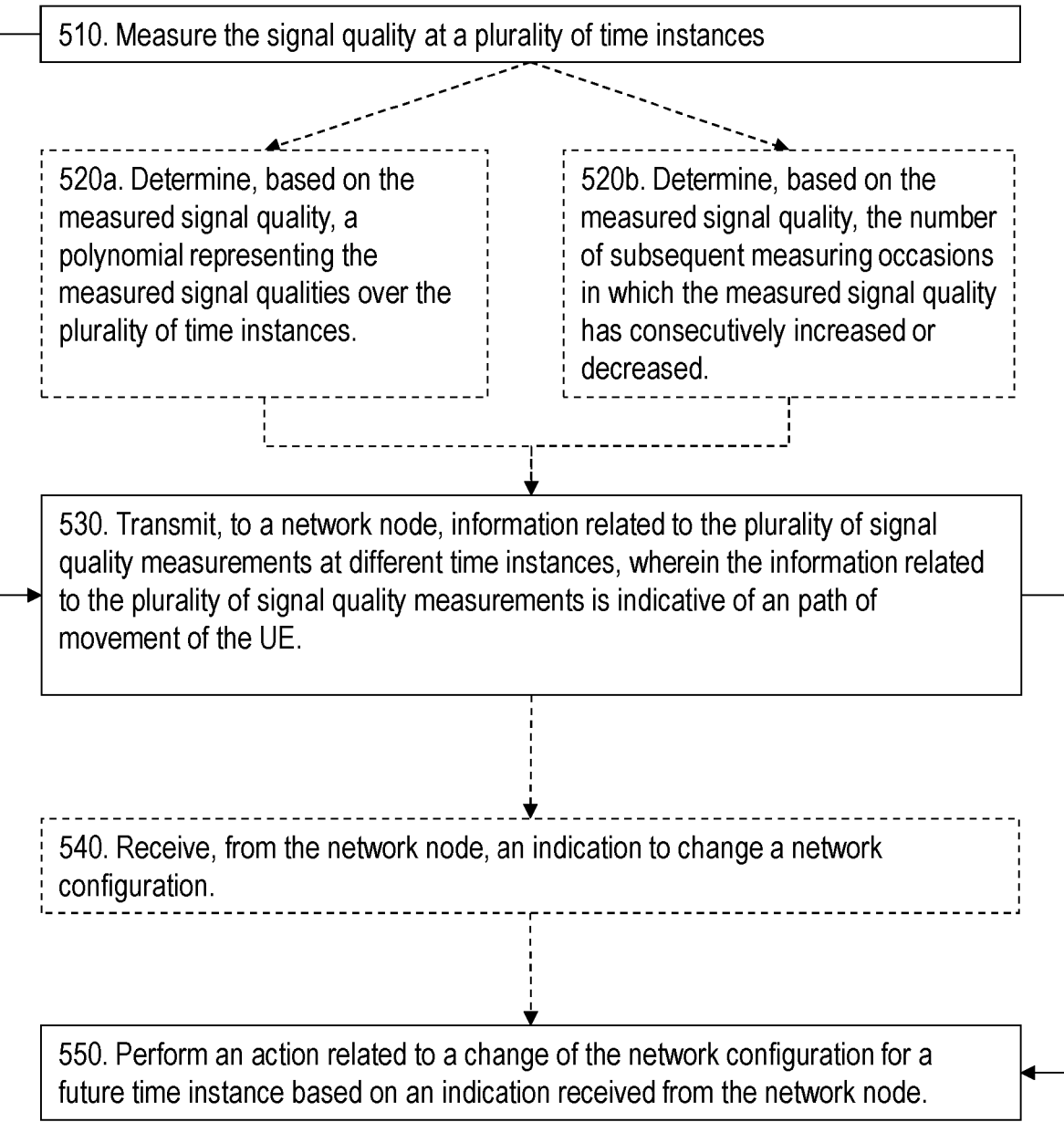

510. Measure the signal quality at a plurality of time instances

520a. Determine, based on the measured signal quality, a polynomial representing the measured signal qualities over the plurality of time instances.

520b. Determine, based on the measured signal quality, the number of subsequent measuring occasions in which the measured signal quality has consecutively increased or decreased.

530. Transmit, to a network node, information related to the plurality of signal quality measurements at different time instances, wherein the information related to the plurality of signal quality measurements is indicative of an path of movement of the UE.

540. Receive, from the network node, an indication to change a network configuration.

550. Perform an action related to a change of the network configuration for a future time instance based on an indication received from the network node.

Fig. 5

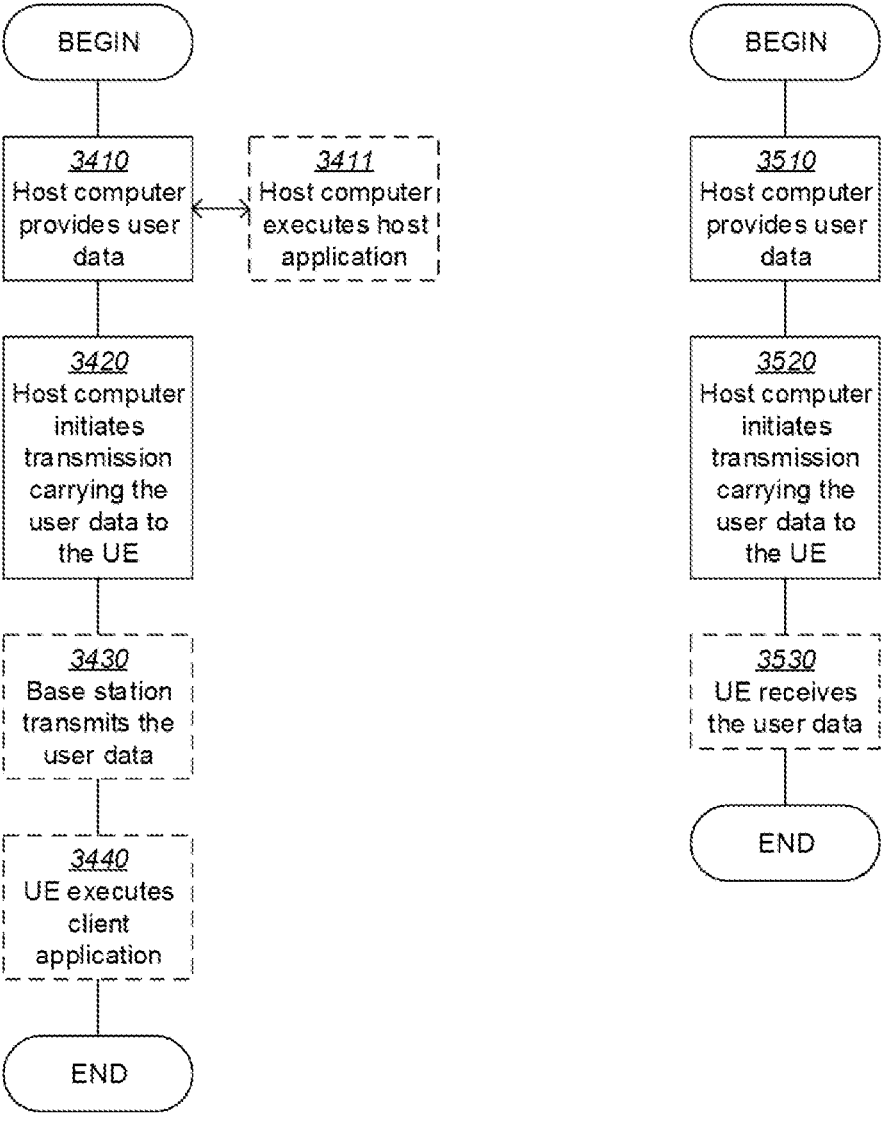
Fig. 18                    Fig. 19

NETWORK NODE, USER EQUIPMENT AND METHODS FOR HANDLING SIGNAL QUALITY VARIATIONS

PRIORITY

This nonprovisional application is a U.S. National Stage Filing under 35 U.S.C. § 371 of International Patent Application Serial No. PCT/SE2019/050411 filed May 9, 2019 and entitled "Network Node, User Equipment and Methods for Handling Signal Quality Variations", which is hereby incorporated by reference in its entirety.

TECHNICAL FIELD

Embodiments herein relate to a network node, a User Equipment (UE) and methods performed therein. In particular, they relate to predicting signal quality variations for a UE in a wireless communication network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

In order to increase the capacity support for higher frequency bands have been provided in 5G. While previous generations of 3GPP communication networks operated on frequencies below 6 GHz, 5G NR may operate on frequency bands up to 300 GHz. By using higher frequencies, the ability to support high data transfer speeds without interfering with other wireless signals or becoming overly cluttered increases. However, when operating at the higher frequencies in NR, such as e.g. at frequencies above 28 GHz, shadowing and penetration loss will increase, since the higher frequencies. This may lead to very quick signal drops, for example when a UE operates in urban environments such as e.g. in a city and loses line of sight to a base station, e.g. when the UE turns around a corner and a building or an obstacle blocks the direct radio path from the UE to a serving base station.

SUMMARY

An object of embodiments herein is thus to improve the performance of UEs operating in a wireless communications network and to avoid dropped service due to quick signal drops.

According to a first aspect of embodiments herein, the object is achieved by a method performed by a network node for handling signal quality variations for a UE. The network node predicts a future signal quality variation indicative of a path of movement for a second UE being served by the network node, wherein the predicting is based on historical data of previous signal quality variations for one or more first UEs having been served by the network node. The historical data of previous signal quality variations is indicative of a path of movement of the one or more first UEs. The network node determines to change a network configuration for the second UE based on the predicted signal quality variation. The network node further initiates the change of the network configuration for the second UE.

According to a second aspect of embodiments herein, the object is achieved by a method performed by a UE for handling signal quality variations for the UE. The UE measures the signal quality at a plurality of time instances. The UE further transmits, to a network node, information related to the plurality of signal quality measurements at different time instances, wherein the information related to the plurality of signal quality measurements is indicative of an path of movement of the UE. The UE further performs an action related to a change of the network configuration for a future time instance based on an indication received from the network node, wherein the action is dependent on a future signal quality of the UE predicted by the network node.

According to a third aspect of embodiments herein, the object is achieved by a network node for handling signal quality variations for a UE. The network node is configured to predict, based on historical data of previous signal quality variations for one or more first UEs having been served by the network node, a future signal quality variation for a second UE being served by the network node. The historical data of previous signal quality variations is indicative of a path of movement of the one or more first UEs. The network node is configured to determine to change a network configuration for the second UE based on the predicted signal quality variation. The network node is further configured to initiate the change of the network configuration for the second UE.

According to a fourth aspect of embodiments herein, the object is achieved by a UE for handling signal quality variations for the UE. The UE is configured to measure the signal quality at a plurality of time instances. The UE is configured to transmit, to a network node, information related to the plurality of signal quality measurements at different time instances. The information related to the plurality of signal quality measurements is indicative of an path of movement of the UE. The UE is further configured to perform an action related to a change of the network configuration for a future time instance based on an indication received from the network node. The action is dependent on a future signal quality of the UE predicted by the network node.

By predicting future signal quality variations indicative of the path of movement for the second UE based on historical data of the one or more first UEs, the network node may initiate changes of the network configuration for the UE to compensate for upcoming predicted signal quality drops. Thereby the quality of the service may be improved and the risk of dropped calls may be reduced.

An advantage of the embodiments disclosed herein is that they enable the network to adapt to the environment by building models that can e.g. predict the future signal quality of a device, which can then be used for improving radio performance such as:

Handover decision,

Scheduling decision—schedule UE based on the predicted quality, and/or link adaptation.

The proposed reporting format according to some of the embodiments herein also allows the UE to use counters to estimate its signal quality change over time, the benefit being that the UE does not need to store multiple samples in its memory, but only needs to update a number of counters $Change_{Threshold}$, $Num_{drop/increaseThreshold}$ and $Total_{drop/increaseThreshold}$. UE can have addition counter defined as $Combined_{drop/increase} = (Total_{drop/increaseThreshold}/Num_{drop/increaseThreshold})$.

Using the counters, the UE can update its handover, cell reselection as well as radio link monitoring parameters based on its mobility, and thereby enhance the performance of the above-mentioned features.

BRIEF DESCRIPTION OF THE DRAWINGS

Examples of embodiments herein are described in more detail with reference to attached drawings in which:

FIG. 4 is a flowchart depicting embodiments of a method performed by a network node according to embodiments herein, FIG. 5 is a flowchart depicting embodiments of a method performed by a UE according to embodiments herein.

FIG. 18 is a flowchart depicting methods implemented in a communication system including a host computer, a base station and a user equipment in accordance with some embodiments;

FIG. 19 is a flowchart depicting methods implemented in a communication system including a host computer, a base station and a user equipment in accordance with some embodiments;

DETAILED DESCRIPTION

As a part of developing embodiments herein the inventors have identified a problem which first will be discussed.

Figure 1:
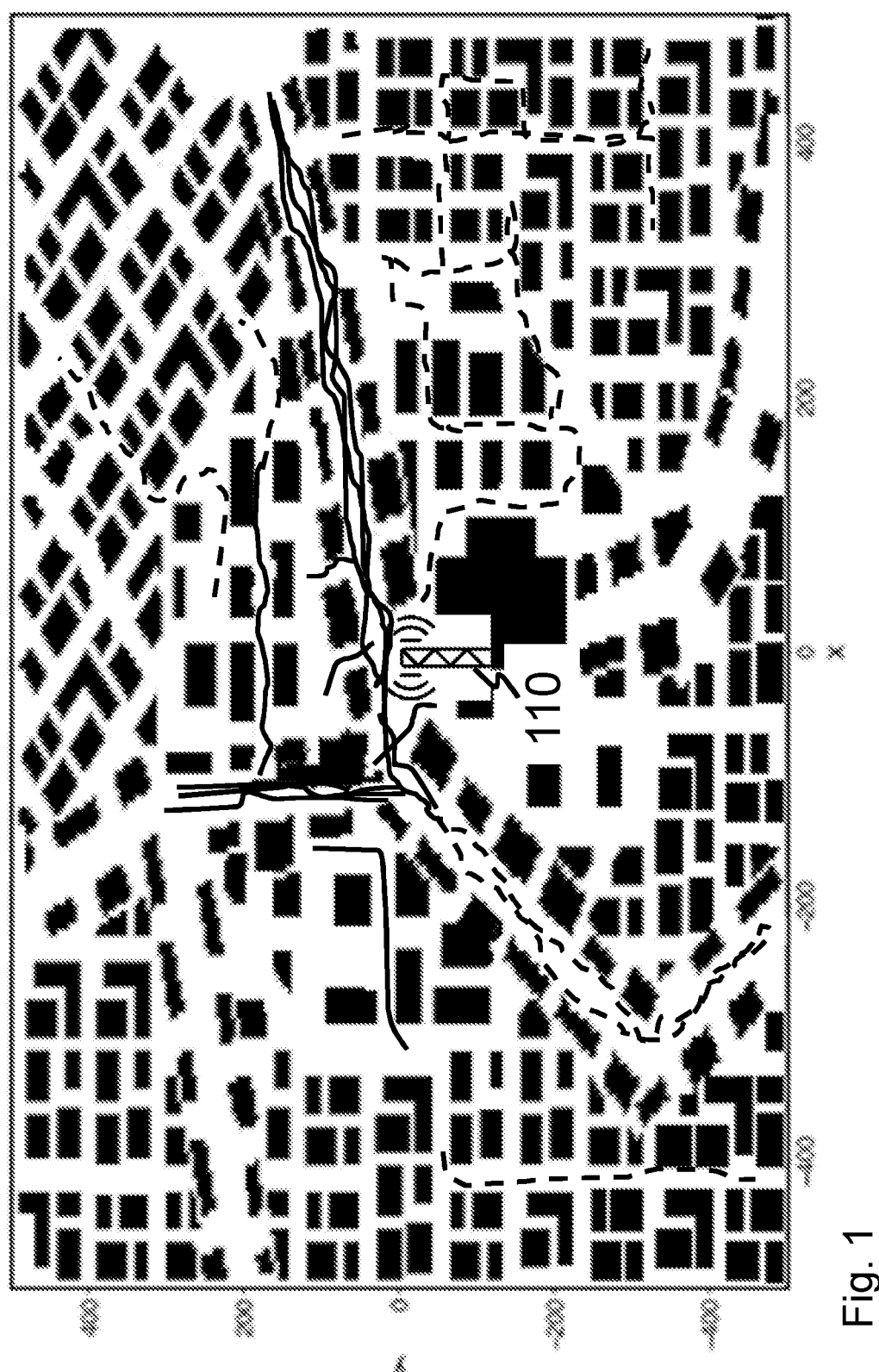
FIG. 1 is a schematic diagram illustrating signal quality variations during UE movement in an urban area.

FIG. 1 discloses a scenario in which a network node 110 is located in an urban area such as e.g. in a city center comprising a large number of buildings and obstacles. The network node 110 has a service area in which it can service a UE. When the UE moves through the urban area it typically follows a certain path determined by the streets of the urban area. When the UE is in the vicinity of the network node 110 a high signal quality may be provided by the network node 110 for transmissions to the UE. However, if the UE suddenly turns around a corner of a street, the surrounding buildings may block the direct line of sight between the UE and the network node 110. This may lead to a sudden drop in signal quality for the moving UE. The dotted lines in FIG. 1 indicate that the signal quality of the UE moving along the path of the dotted line drops <−120 dBm when being served by the network node 110 in comparison to when the UE moves along the path marked by the solid line in FIG. 1. Two UEs 120 moving in the same area, for example along the same street or turning around the same corner of a street, will experience similar signal quality characteristics.

The embodiments herein thus relate to a method for a network, such as e.g. the network node 110, to learn, which may also be referred to as determine, signal quality variations for UEs, and based on the learning, set network parameters or perform network decisions. In other words, the network node may determine a predictive model by studying previous signal quality variations and may use the predictive model to predict a signal quality variation, such as e.g. a quick drop in signal quality for a moving UE. The network may for example learn when a quick signal quality drop is likely to occur for a UE by using historical data, e.g. from other UEs having previously moved in the area service by the network mode 110, and thereby for example setup an inter-frequency measurement in order to perform a handover to a network node providing a better signal quality. The predictive model may thus be used to take actions for reducing the impact of a signal drop based on received data from the UEs. In order to limit the UE impact, a counter-based framework for UE-monitoring of the signal quality variation is also described herein. In another embodiment, the network may configure handover parameters based on the UE mobility, where the UE may monitor its mobility efficiently with a proposed new counter-based framework according to some of the embodiments herein.

The counter-based framework enables the UEs to monitor signal quality variations without needing to store an excessive amount of data. The UE may have multiple counters and the UE behavior of how to use these counters can be specified in the standard. The new proposed counters may comprise one or more of the following:

1) Numdrop/increase: Number of successive dropped/improved measurement quantity (RSRP/RSRQ/SINR etc.).

2) Totaldrop/increase: Accumulated dropped/improved measurement quantity during the period between the resetting of the counter.

In addition to these counters, the network provides one or more of thresholds (in other embodiment these thresholds could be fixed in the standard as well), ChangeThreshold, Numdrop/increaseThreshold and Totaldrop/increaseThreshold to be used in conjunction with these counters. How to configure and use these counters are provided in section 5.4.

Figure 2:
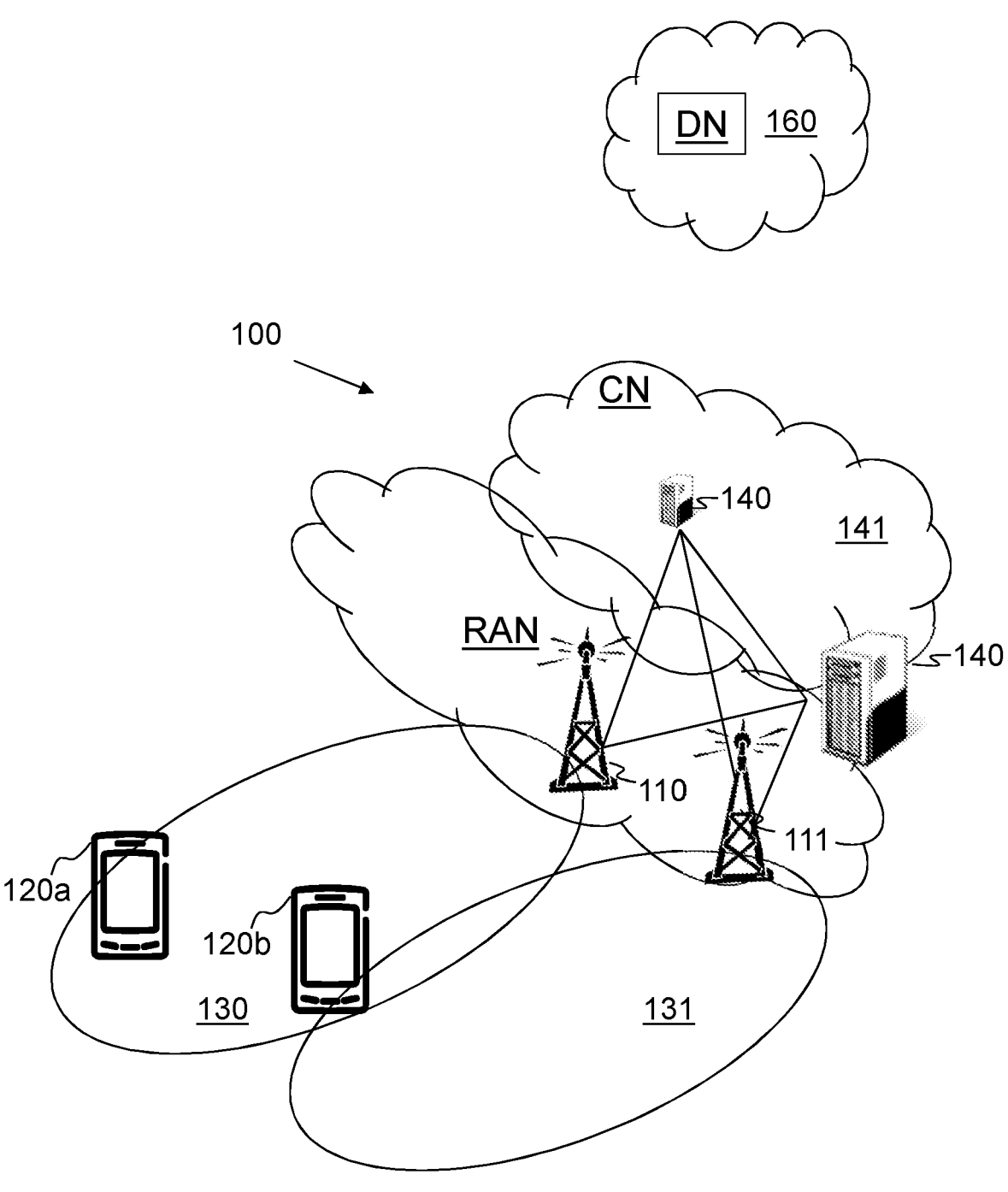
FIG. 2 is a schematic block diagram illustrating embodiments of a wireless communications network.

FIG. 2 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices e.g. one or more UEs 120, such as a first UE 120a and a second UE 120b, also referred to as device, such as a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 100 comprises one or more network nodes 110, 111 providing radio coverage over a geographical area, such as a cell 130, which may also be referred to as a beam or a beam group of a first radio access technology (RAT), such as 5G, LTE, Wi-Fi or similar. The network node 110 may e.g. be a radio network node such as a NG-RAN node, transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The network node 110 may be referred to as a serving network node or source node when the network node communicates with the one or more UEs 120 with Downlink (DL) transmissions sent from the network node 110 to the UE 120 and Uplink (UL) transmissions received by the network node 110 from the UE 120.

As an alternative, a Distributed Node (DN) and functionality, e.g. comprised in a cloud 160 as shown in FIG. 1 may be used for performing or partly performing the methods disclosed herein.

When the UEs 120 move through the network 100 they may leave the coverage area 130 of the serving network node 110. In order to ensure a continuous service the UEs 120 are configured to perform mobility measurements on the network nodes 110, 111 in the vicinity of the UE 120 and to report these measurements to the serving network node 110 in order to determine if a handover should be performed to a target network node 111 providing a better quality of service than the serving network node 110.

When the UE 120 is in Radio Resource Control (RRC) connected mode, which may also be referred to as an RRC_CONNECTED UE in LTE, it may be configured by the network to perform measurements and, upon triggering measurement reports the network may send a handover command to the UE 120. The handover command may be conveyed by a mobilityControlInfo Information Element (IE) in an RRCConnectionReconfiguration message in LTE and by a reconfigurationWithSync IE in an RRCReconfiguration message in NR. In the following LTE may also be referred to as EUTRA.

These reconfiguration fields, i.e. mobilityControlInfo and reconfigurationWithSync, are prepared by the target network node 111, which is responsible for a target cell, upon a request from a source network node 110 (over an X2 or S1 interface in case of EUTRA-EPC or Xn or NG interface in case of EUTRA-5GC or NR-5GC) and takes into account the existing RRC configuration that the UE 120 has with a source cell. The existing RRC configuration may be provided in an inter-node request between the source node and the target node. Among other parameters, the reconfiguration provided by the target node may comprise all information that the UE 120 needs to access the target cell, e.g., random access configuration, a new C-RNTI assigned by the target network node 111 to be valid in the target cell and security parameters enabling the UE 120 to calculate new security keys associated with the target cell so that the UE 120 can send a handover complete message on a Signaling Radio Bearer 1 (SRB1) based on new security keys upon accessing the target cell. The SRB1 is an encrypted and integrity protected radio bearer.

Figure 3:
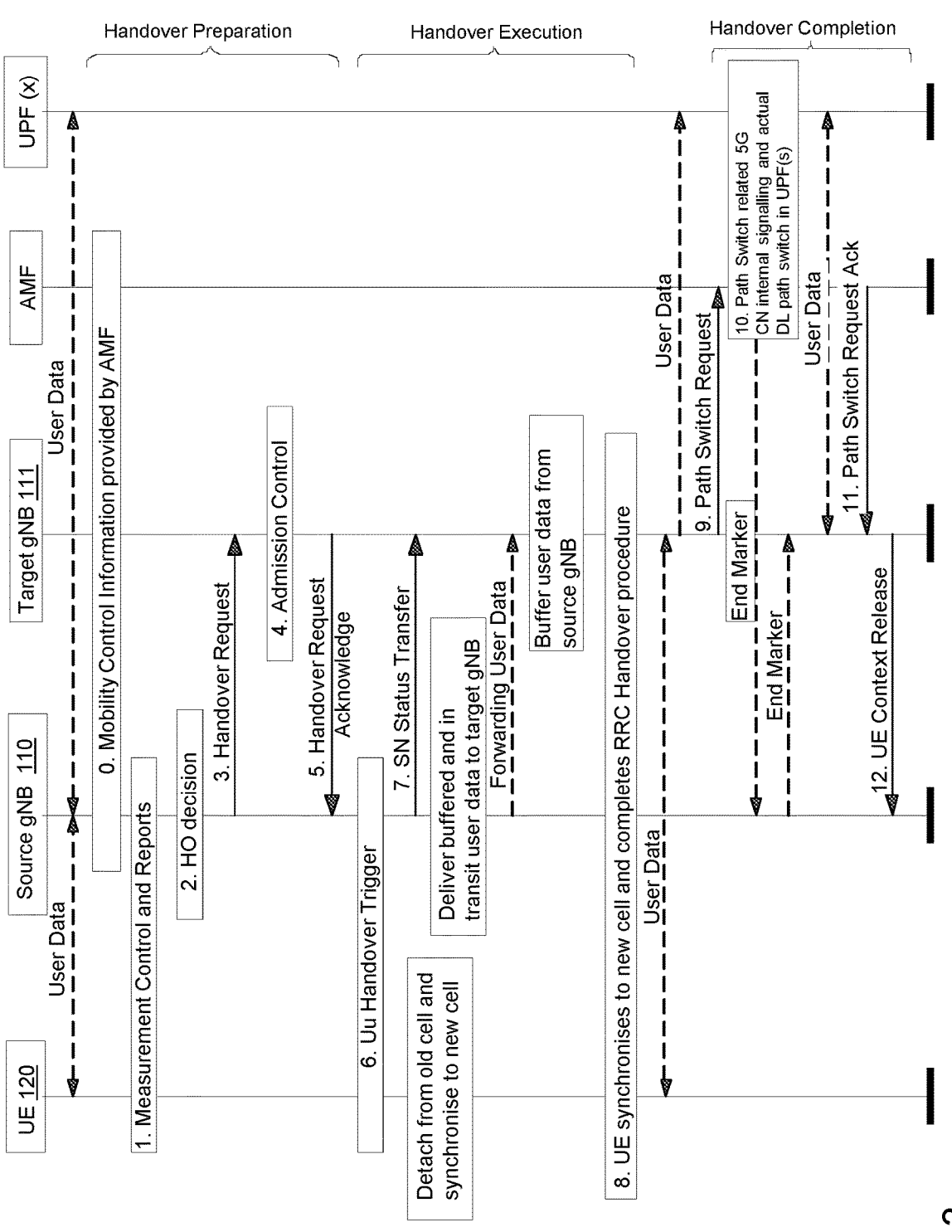
FIG. 3 is a signaling diagram depicting a handover procedure for a UE.

FIG. 3 shows a signaling flow between the UE 120, the source node 110 and the target node 111 during a handover procedure in the NR/5GC scenario.

In both LTE and NR, some principles exist for handovers, which in more general terms may be referred to as mobility in RRC_CONNECTED state:

Mobility in RRC_CONNECTED state is network-based as the network has the best information regarding the current situation, such as e.g. load conditions, resources in different nodes and cells, available frequencies, etc. The network may also consider the situation of many UEs 120 in the network, for a resource allocation perspective, e.g. involving handovers for load balancing purposes.

The network may prepare a target cell before the UE 120 accesses that specific cell. The source node 110 may provide the UE 120 with the RRC configuration to be used in the target cell, such as e.g. the RRC configuration received from the target node, such as e.g. the network node 111, in case of inter-node handover, including an SRB1 configuration for sending the Hand Over (HO) complete message.

The UE 120 may be provided, by the target node, such as e.g. the network node 111, with a target Cell Radio Network Temporary Identifier (C-RNTI), i.e. the target node may identify the UE 120 from a message 3 (MSG.3) on a Medium Access Control (MAC) level. More precisely, the C-RNTI may be comprised in a C-RNTI MAC Control Element (CE) in the MAC Protocol Data Unit (PDU) comprising the HO complete message. Hence, there is no context fetching, unless a failure occurs.

To speed up the handover, the network may provide the needed information on how to access the target cell, such as e.g. a Random Access Channel (RACH) configuration, so the UE 120 does not have to acquire System Information (SI) in the target cell prior to the handover and target cell access.

The UE may be provided with Contention Free Radio Access (CFRA) resources including a dedicated random access preamble, i.e. in that case the target node identifies the UE 120 from the random access preamble (MSG.1). In addition a CFRA procedure may be optimized with dedicated resources. In conditional handover (which is described further below) that might be a bit tricky as there is uncertainty about the final target cell and also about the timing.

The security mechanisms may be prepared before the UE 120 accesses the target cell, i.e. keys must be refreshed before sending the HO complete message, such as e.g.

an RRCConnectionReconfigurationComplete message in LTE or an RRCReconfigurationComplete message in NR, based on new keys and encrypted and integrity protected so that the UE 120 can be verified in the target cell.

Both full and delta reconfiguration (where delta reconfiguration means that only the differences from the old configuration are signaled) are supported so that the HO command may be minimized.

Example embodiments of a method performed by a network node 110 for handling signal quality variations for a UE will now be described with reference to a flowchart depicted in FIG. 4.

The method comprises the following actions, which actions may be taken in any suitable order. Actions that are optional are presented in dashed boxes in FIG. 4.

Action 410

The network node 110 may obtain information regarding signal quality measurements for a plurality of time instances for one or more first UEs 120a.

The information regarding signal quality measurements for the one or more first UEs 120a may be obtained by receiving, from the one or more first UEs 120a information regarding DL measurements of the signal quality for each of the one or more first UEs 120a.

The information regarding the signal quality measurements may in some embodiments be obtained by the network node 110 performing UL measurements of the signal quality for each of the one or more first UEs 120a.

In some embodiments the information regarding signal quality measurements for the one or more first UEs 120a may be obtained as a plurality of measurements.

The information regarding signal quality measurements for the one or more first UEs 120a may however also be obtained as a polynomial representing the plurality of measurements.

The information regarding signal quality measurements for the one or more first UEs 120a may in some further embodiments be obtained as a number of subsequent measurement occasions in which the measured signal quality has consecutively increased above a predetermined threshold or decreased below a predetermined threshold.

The obtained signal quality may be one of a RSRQ, RSRP, or SINR. In other words the obtained signal quality measurement may be one of an RSRQ, RSRP or SINR measurement.

Action 420

The network node 110 may generate a predictive model for the obtained signal quality measurement for each of the one or more first UEs 120a at a time instance, based on the obtained signal quality measurements for each of the one or more first UEs 120a at one or more previous time instances, wherein the signal quality measurements are indicative of a path of movement of the one or more first UEs 120a.

This action 420 is similar to a training phase as described in the following with regards to the machine learning model.

Action 430

The network node 110 predicts a future signal quality variation indicative of a path of movement for a second UE 120b being served by the network node 110. The predicting is based on historical data of previous signal quality variations for the one or more first UEs 120a having been served by the network node 110. The historical data of previous signal quality variations is indicative of a path of movement of the one or more first UEs 120a.

This action 430 corresponds to a predictive function and/or a predictive phase as described in the following.

Action 430a

The network node 110 may predict the signal quality variation for the second UE 120b by obtaining information regarding signal quality measurements for a plurality of time instances for the second UE 120b.

The information regarding signal quality measurements for the second UE 120b may be obtained by receiving, from the second UE 120b information regarding DL measurements of the signal quality for each of the one or more first UEs 120b.

The information regarding the signal quality measurements may in some embodiments be obtained by the network node 110 performing UL measurements of the signal quality for the second UE 120b.

In some embodiments the information regarding signal quality measurements for the second UE 120b may be obtained as a plurality of measurements.

The information regarding signal quality measurements for the second UE 120b may however also be obtained as a polynomial representing the plurality of measurements.

The information regarding signal quality measurements for the second UE 120b may in some further embodiments be obtained as a number of subsequent measurement occasions in which the measured signal quality has consecutively increased or decreased above a predetermined threshold.

Action 430b

The network node 110 may further determine, based on the obtained information regarding signal quality measurements obtained for the second UE 120b in action 430a, a signal quality of the second UE 120b at a future time instance using a predictive model generated based on obtained signal quality measurements indicative of a path of movement for the one or more first UEs 120a.

The predictive model may be a machine learning based model which is trained based on historical data of previous signal quality variations. The machine learning based model may be one of, or a combination of a decision tree model, a random forest of decision trees model, a neural network, a nearest neighbor model, and/or a logistic regression model or any other suitable model.

Action 440

The network node 110 decides to change a network configuration for the second UE 120b based on the predicted signal quality variation indicative of the path of movement for the second UE 120b. The change to the network configuration may e.g. be an initiating of inter-frequency and/or intra-frequency handover, setting handover/reselection parameters, or changing a UE scheduler priority, for example to schedule the second UE 120b when the expected signal quality is good.

This action 440 is similar to the embodiments described in the section "Network actuation based on the learning" as described in the following.

Action 450

The network node 110 initiates the change of the network configuration for the second UE 120b.

The network node 110 may e.g. initiate the change of the network configuration by sending, to the second UE 120b, an indication to change the network configuration. The indication to change the network configuration for the second UE 120b may be one or more of an indication to initiate an inter-frequency handover, initiate an intra-frequency handover, and/or to change handover and/or reselection parameters.

The network node 110 may initiate the change of the network configuration by changing a scheduling priority for the second UE 120b.

Example embodiments of a method performed by a UE 120a, 120b for handling signal quality variations for the UE 120a, 120b will now be described with reference to a flowchart depicted in FIG. 5.

The method comprises the following actions, which actions may be taken in any suitable order. Actions that are optional are presented in dashed boxes in FIG. 5.

Action 510

The UE 120a, 120b measures the signal quality at a plurality of time instances. The signal quality measured may be one of a Reference Signal Received Quality, RSRQ, a Reference Signal Received Power, RSRP, a Signal to Interference and Noise Ratio, SINR. The signal quality may be measured by the UE 120a, 120b in the DL.

Action 520a

The UE 120a, 120b may determine, based on the measured signal quality, a polynomial representing the measured signal qualities over the plurality of time instances, Action 520b

The UE 120a, 120b may determine, based on the measured signal quality, the number of subsequent measuring occasions in which the measured signal quality has consecutively increased or decreased.

Action 530

The UE 120a, 120b transmits, to a network node 110, information related to the plurality of signal quality measurements at different time instances, wherein the information related to the plurality of signal quality measurements is indicative of an path of movement of the UE 120a, 120b.

When the UE 120a, 120b has determined a polynomial representing the measured signal qualities over the plurality of time instances the UE 120a, 120b may transmit the signal quality measurements as the determined polynomial.

Action 540

The UE 120a, 120b may receive, from the network node 110, an indication to change a network configuration. The network configuration may e.g. be changed for a future time instance. The indication to change the network configuration for the second UE 120b may e.g. be one or more of an indication to initiate an inter-frequency handover, initiate an intra-frequency handover, and/or to change handover and/or reselection parameters.

The indication may e.g. be a set of threshold values or a polynomial based on which the UE 120 shall trigger measurement reporting to the network node 110.

Action 550

The UE 120a, 120b performs an action related to a change of the network configuration for a future time instance based on an indication received from the network node 110. The action is dependent on a future signal quality of the UE 120a, 120b predicted by the network node 110.

The action performed by the UE 120a, 120b may be one or more of initiating an inter-frequency handover, initiating an intra-frequency handover, and/or changing handover/reselection parameters.

When the UE 120a, 120b has determined the number of subsequent measuring occasions in which the measured signal quality has consecutively increased or decreased, the UE 120a, 120b may perform the action related to the change of the network configuration when the number of subsequent measuring occasions in which the measured signal quality has consecutively increased or decreased is above a predetermined threshold.

Embodiments herein such as mentioned above will now be further described and exemplified. The text below is applicable to and may be combined with any suitable embodiment described above.

In order to predict the signal quality variation for the UE 120, such as the second UE 120*b*, the network node 110 may in one embodiment use a method based on training of a machine learning model.

This method will first be described by the example shown in FIG. 6. In the example shown in FIG. 6, a first UE 120*a* and a second UE 120*b* are moving along a similar path and are turning around the same corner of a street according to the location plot shown in FIG. 6. The first UE 120*a* shown with the solid line, first turns around the corner and experiences a large signal quality drop. According to the embodiments herein, the signal quality drop of a second UE 120*b*, shown here with the dotted line, may be mitigated by learning from, which may also be referred to as studying, the first UEs 120*a* experience. FIG. 7 shows how the first and second UEs 120*a*, 120*b* are having similar measured signal quality characteristics, in this example RSRP characteristics, when the first and the second UE 120*a*, 120*b* are moving along the same or similar paths according to the example shown in FIG. 6.

From the example described above, two important steps are described further below. Firstly a UE reporting framework, e.g. reporting the signal quality as shown in FIG. 7, and secondly a machine learning model training based on the received data from the UEs 120 and the actuation will be described.

Reporting and Triggering of Reports

UEs in LTE and NR are required to monitor a downlink link quality based on reference signal(s), perform the measurements on the reference signals (such as e.g., Secondary Synchronization-Reference Signal Received Power (SS-RSRP), Secondary Synchronization-Reference Signal Received Quality (SS-RSRQ), Secondary Synchronization-Signal to Interference and Noise Ratio (SS-SINR) for NR cells) of the identified cells and to report the measured samples to the network, according to the requirements specified in the 3GPP TS 36.133 for LTE and 3GPP TS 38.133 for NR respectively.

The UE 120 may send a measurement report when the conditions as configured by the network are fulfilled. These Event A1 (Serving Becomes Better than Threshold)

The UE 120 shall:

1> consider the entering condition for this event to be satisfied when condition A1-1, as specified below, is fulfilled;

1> consider the leaving condition for this event to be satisfied when condition A1-2, as specified below, is fulfilled;

1> for this measurement, consider the NR serving cell corresponding to the associated measObjectNR associated with this event.

Where the conditions A1-1 and A1-2 are defined as follows.

Inequality A1-1 (Entering Condition)

$$Ms-Hys>Thresh$$

Inequality A1-2 (Leaving Condition)

$$Ms+Hys<Thresh$$

The variables in the formula are defined as follows:

$Ms$ is the measurement result of the serving cell, not taking into account any offsets.

$Hys$ is the hysteresis parameter for this event (i.e. hysteresis as defined within reportConfigNR for this event).

$Thresh$ is the threshold parameter for this event (i.e. a1-Threshold as defined within reportConfigNR for this event).

$Ms$ is expressed in dBm in case of RSRP, or in dB in case of RSRQ and RS-SINR.

$Hys$ is expressed in dB.

$Thresh$ is expressed in the same unit as $Ms$.

The time-to-trigger parameter is defined as below in the 3GPP TS 38.331 specification.

The IE TimeToTrigger specifies a value range used for time-to-trigger parameter, which concerns the time during which specific criteria for the event needs to be met in order to trigger a measurement report. Value ms0 corresponds to a time of 0 ms, i.e., the timer shall be started and shall immediately expire, ms40 corresponds to the timer expiring after 40 ms, and so on.

| TimeToTrigger information element |
|---|
| -- ASN1START |
| -- TAG-TIMETOTRIGGER-START |
| TimeToTrigger ::=      ENUMERATED { |
|           ms0, ms40, ms64, ms80, ms100, ms128, ms160, mo256, |
|           ms320, ms480, ms512, ms640, ms1024, ms1280, ms2560, |
| ms5120 } | conditions may be time based (e.g., periodic reporting) or the received signal related measurement based (e.g., event triggered reporting). The event triggered reporting is associated with Reference Signal Received Power (RSRP), Reference Signal Received Quality (RSRQ) or Signal to Interference and Noise Ratio (SINR) related measurements. The measurements used for evaluating the event triggering criterion are Layer 3 (L3) filtered.

In order to control when the measurement needs to be sent from the UE, the network may use several parameters like Ax-offset (A1 offset, A2 offset, . . . , A6 offset), frequency-specific offset, Time-To-Trigger (TTT), etc. An example of a definition of an A1 event (defined in the 3GPP TS 38.331 specification 5.5.4.2) is captured as below.

Speed Based Scaling Handover Parameter

In LTE and NR, speed-based scaling of TTT defined for the connected mode and T-Reselection (defined for the idle mode) parameters have been introduced. For UEs in the RRC idle mode in LTE and NR, the broadcasted system information may comprise speed dependent scaling related parameters like TCRmax, NCR_M, NCR_H, TCRmaxHyst, etc. These are defined as follows (specified in 3GPP TS 36.304 for LTE and specified in 3GPP TS 38.304 for NR).

Speed Dependent Reselection Parameters

Speed dependent reselection parameters are broadcast in system information and are read from the serving cell as follows:

$T_{CRmax}$ specifies the duration for evaluating allowed amount of cell reselection(s).

$N_{CR\_M}$ specifies the maximum number of cell reselections to enter Medium-mobility state.

$N_{CR\_H}$ specifies the maximum number of cell reselections to enter High-mobility state.

$T_{CRmaxHyst}$ specifies the additional time period before the UE can enter Normal-mobility state.

Speed Dependent ScalingFactor for Qhyst

This specifies scaling factor for Qhyst in sf-High for High-mobility state and sf-Medium for Medium-mobility state.

Speed dependent ScalingFactor for $Treselection_{EUTRA}$

This specifies scaling factor for $Treselection_{EUTRA}$ in sf-High for High-mobility state and sf-Medium for Medium-mobility state.

Figure 8:
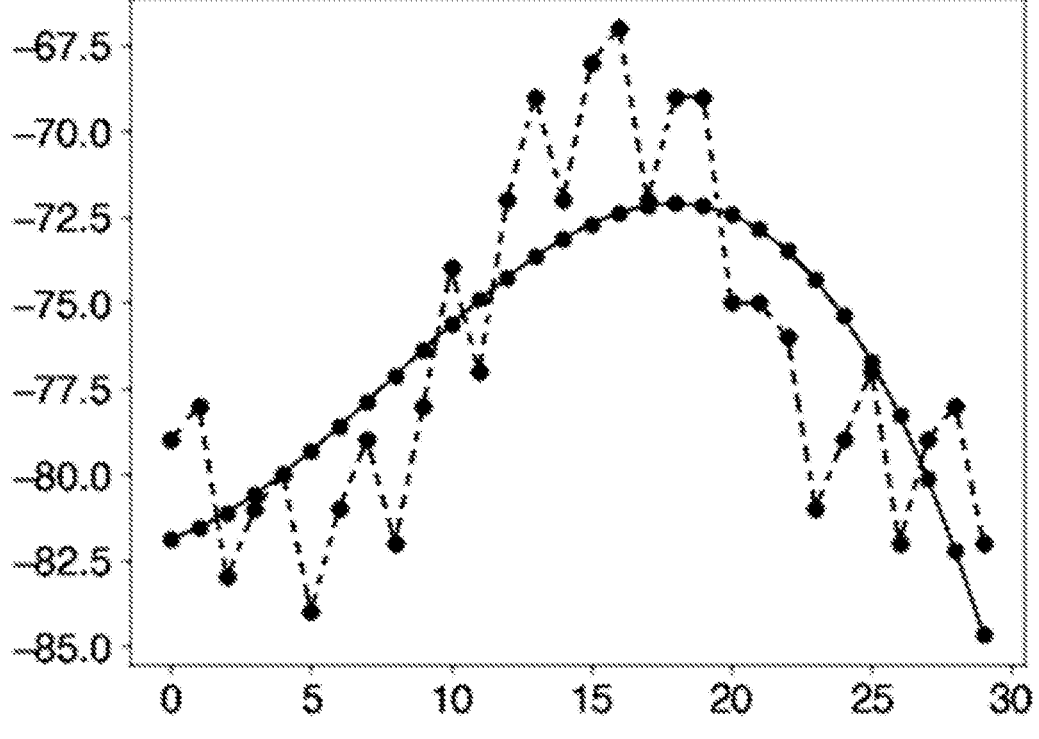
FIG. 8 illustrates a reporting effort for two different methods for reporting signal quality measurements.

FIG. 8 shows two different types of UE measurement reporting. The UE 120 may report RSRP/SINR/RSRQ using existing NR measurement events, such as described in section 9.1.2 in TS 38.133, for example, using periodic reporting, or event triggered reporting. Using this report, the network, such as e.g. the network node 110, may receive measurements illustrated by the points in the dotted line in FIG. 8. However, this may lead to an excessive amount of reporting.

In one embodiment, a UE report may be triggered if the RSRP value has increased above a threshold or decreased below a threshold, which threshold may e.g. be defined in dB, in respect to the last UE measurement report.

In another embodiment, the UE 120 may report a polynomial representing the measured RSRP/RSRQ/SINR of the strongest beam for a specified time window, or a polynomial for the measured RSRPs of all the measured CSI-RS resources, or the polynomial of the measured RSRPs of CSI-RS resources above a signal strength threshold signaled from the network, such as e.g. from the network node 110. The time window for the polynomial may be configured at the network, such as e.g. by the network node 110. The solid line in FIG. 8 shows an example of a polynomial with 30 samples. In comparison to the periodical reporting of RSRP data, as shown with the dotted line, the amount of reporting may be reduced. In the example shown in FIG. 8, the dotted line requires reporting of 30 samples, while the solid line only needs to report the polynomial coefficients, which in this case may be a third order polynomial. The UE 120 may be configured with the polynomial order or it may be selected at the UE 120.

In yet another embodiment, when the network, such as e.g. the network node 110, has built a model of what polynomials that should trigger an action, such as e.g. that the signal quality will drop, it may configure one or more polynomial(s) to the UE 120 and when the UE 120 matches with any of the configured polynomials, it reports the polynomial(s) to the network, such as e.g. to the network node 110.

In another embodiment, the signal quality may be estimated using uplink sounding from the UE 120. For uplink, the network node 110, which may be a base station (BS), such as e.g. an eNB or a gNB, may calculate channel estimations based on the UE transmitted sounding reference signals (SRS). The SRS transmission may be periodic where the SRS are transmitted at a fixed periodicity and aperiodic, where the control channel triggers one-time SRS transmissions. In other words, the network node 110 may trigger aperiodic SRS transmissions via the control channel. The benefit of uplink-only based signal quality estimation is that the overhead related to the UE reporting downlink measurements, such as e.g. CSI-RS RSRP measurements, can be removed.

Figure 6:
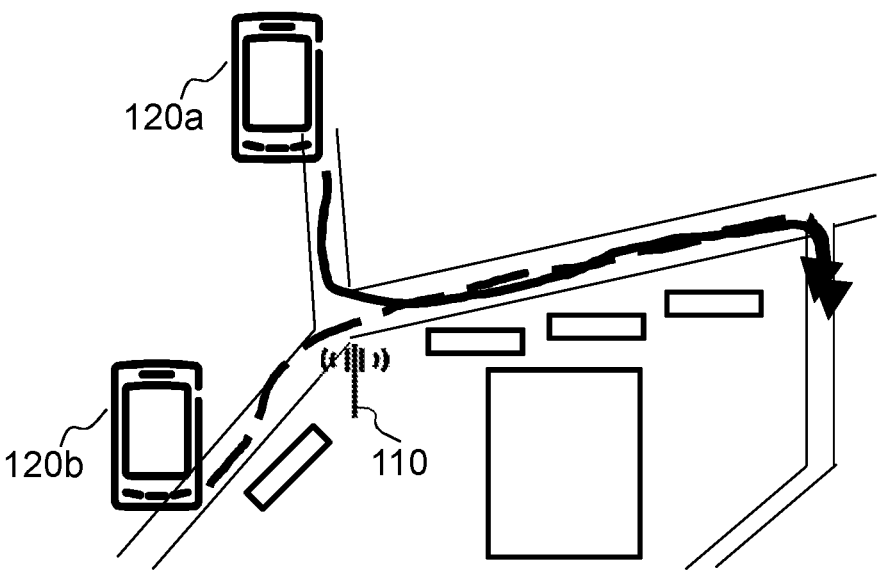
FIG. 6 is a schematic illustration of a scenario in which two UEs moving along similar paths.
Figure 7:
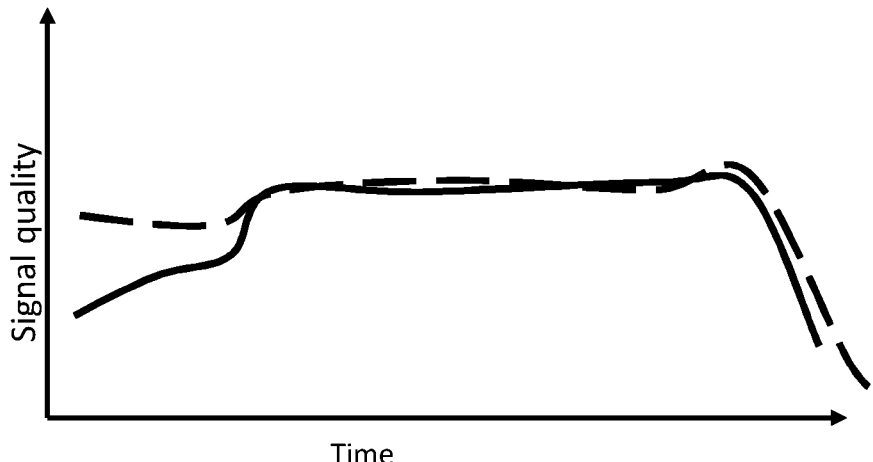
FIG. 7 is a diagram illustrating the signal quality variation for the two UEs in the scenario shown in FIG. 6.
Figure 9:
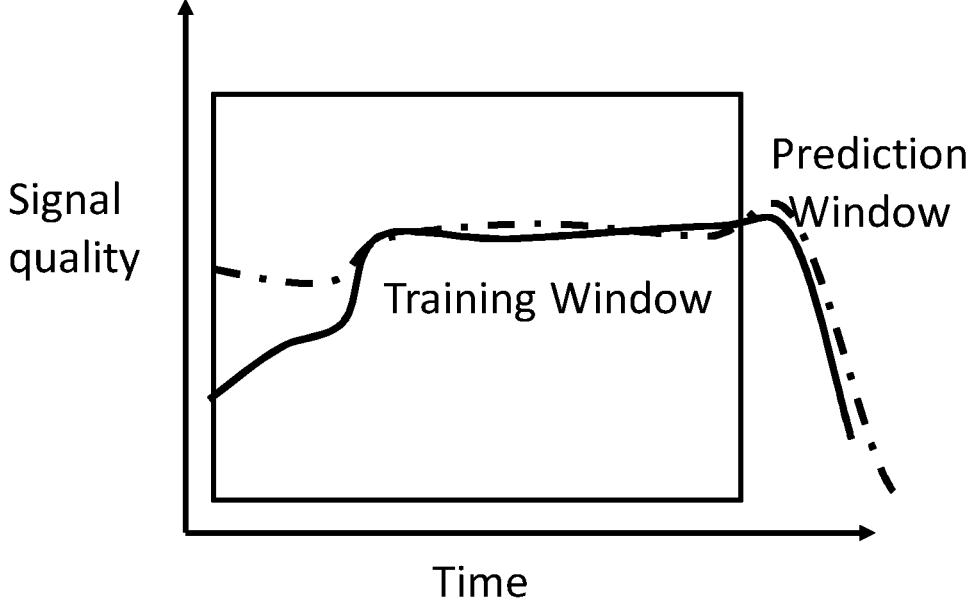
FIG. 9 illustrates a use of received signal quality measurements from the UE for training and implementation of a predictive model.

Based on the data received from the UE 120, the network, such as e.g. the network node 110, may learn e.g. what sequence of RSRP that results in a large signal quality drop, which sequence may e.g. be the UE 120 turning around the corners as shown in FIG. 6. This may e.g. be done by dividing a periodic reported RSRP data into a training and a prediction window as illustrated in FIG. 9.

Figures 10A, 10B:
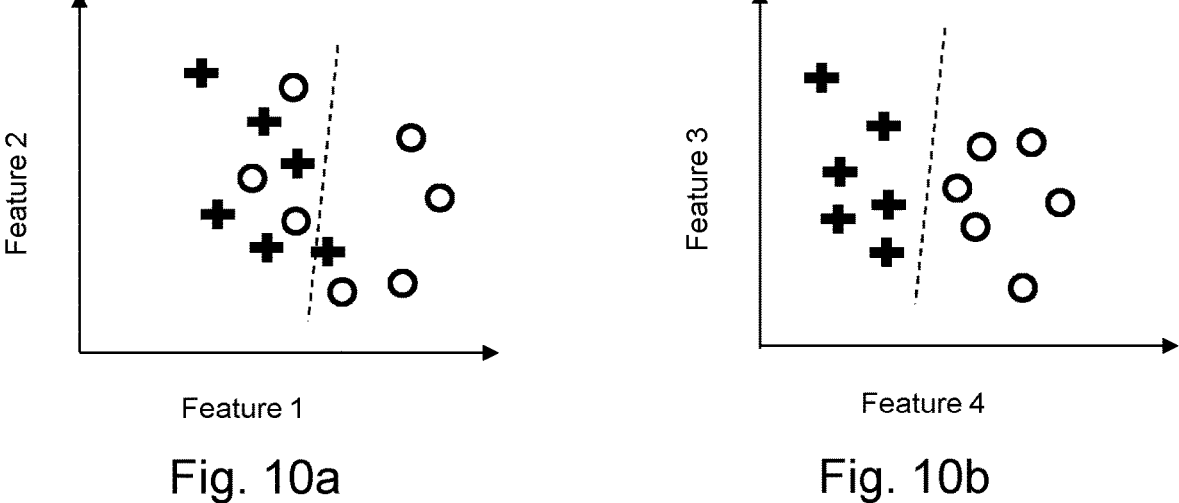
FIG. 10*a-b* illustrates examples of a classification based training method for the predictive model.

More generally, a machine learning (ML) model may comprise input features x, an ML model f, and an output y. Machine learning may be used to find a predictive function for a given dataset; the dataset is typically a mapping between a given input to an output. The idea is thus to determine a mapping between f(x)→y by collecting measurements of both x and y. The predictive function (or mapping function) may be generated in a training phase, where the training phase assumes knowledge of both the input and the output. A subsequent test phase may comprise predicting the output for a given input. Applications of machine learning may e.g. be curve fitting, facial recognition and/or spam filters. FIGS. 10a and 10b show an example of one type of machine learning, namely classification, where the task is to train a predictive function that separates the two classes, in this case circle and cross class. In FIG. 10a, feature 1 and 2 provides low separation of the output class, hence leading to a worse prediction performance in comparison with FIG. 10b which uses features 3 and 4. As can be seen in FIG. 10b, using feature 3 and 4 enables a better separation and classifying performance. In general, the performance of the machine learner is proportional to the correlation between the input and the output. One key problem in machine learning is therefore to find and/or to create good features for the model. Furthermore, it is important to collect enough data samples.

During the predictive phase, the output y may be predicted based the collected measurements as input x, and actions may be taken based on the predicted y as will further be explained in the following.

In the embodiments disclosed herein, the input x for the model f may be a sequence of one or more of:

Uplink channel quality measurements

For example the total and/or average received signal power of the UE transmitted SRS.

Uplink channel estimates

One channel estimate may be performed for each resource block and antenna. In case there are 100 antennas and 20 MHz bandwidth with subcarrier spacing of 15 kHz (which is 100 resource blocks, according to standard LTE configuration), the input for one time-instance is of the dimension 100×100.

Downlink UE signal quality estimates, such as:

SS-RSRP, SS-RSRQ, SS-SINR

CSI-RS-RSRP, CSI-RS-RSRQ, CSI-RS-SINR

Polynomial representation of above signal quality estimates:

As described above, the UE 120 may also report a polynomial representation over a time window for one or more reference signals. This also allows the network, such as the network node 110, to create a model that predicts the UE signal quality in the future. The input to the ML model may be the coefficients of the polynomial(s).

The output y from the model f may be:

Signal quality of a reference signal (e.g. SS-RS) in time T, where T is a time-instance after the latest input measurement. The signal quality may e.g. be:

RSRP,

RSRQ, and/or

SINR.

Mobility state,

Handover parameters, and/or beam failure detection parameters.

Figure 11:
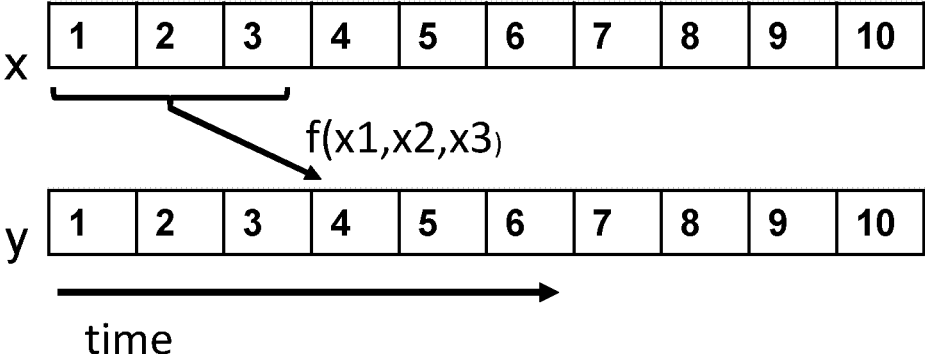
FIG. 11 illustrates a method for training of the predictive model using a number of past measurements to predict a future value.

In the training phase, the network, such as e.g. the network node 110, may obtain measurement samples over a certain duration of time N for one or more first UEs 120a. The network may then build a model using the obtained samples with a determined window size. This is illustrated in FIG. 11 for a UE with the duration N=10, where the ML model input x consists of three measurements in time, and wherein the ML model learns an output y in a future time frame (in this example 1 time-frame further). The time may represent a subframe number in LTE/NR, a slot number, an OFDM symbol etc. The network, such as the network node 110, trains the model f by using three past measurements to predict a future value y. In this setup with ten collected measurements and a one time-step prediction, the network may train a model using seven samples.

Figure 12A:
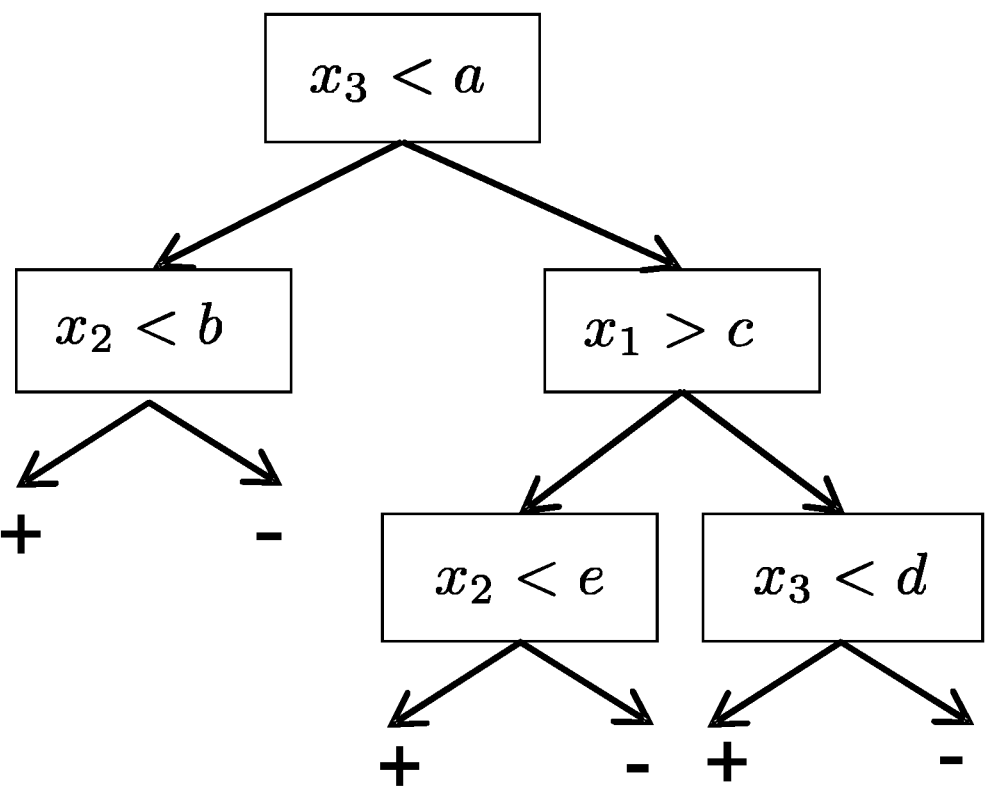
FIG. 12*a-c* illustrates examples of machine learning methods for creating the predictive model.

The model f may e.g. be one or more of the following:

Decisions tree model. Decision trees, as shown in FIG. 12a, which are also known as classification trees or regression trees, are supervised learning methods used to create a model that predicts the value of a target variable by learning simple decision rules inferred from the data features. To predict a response, a leaf node is to be reached from the root node by following the decisions.

Figure 12B:
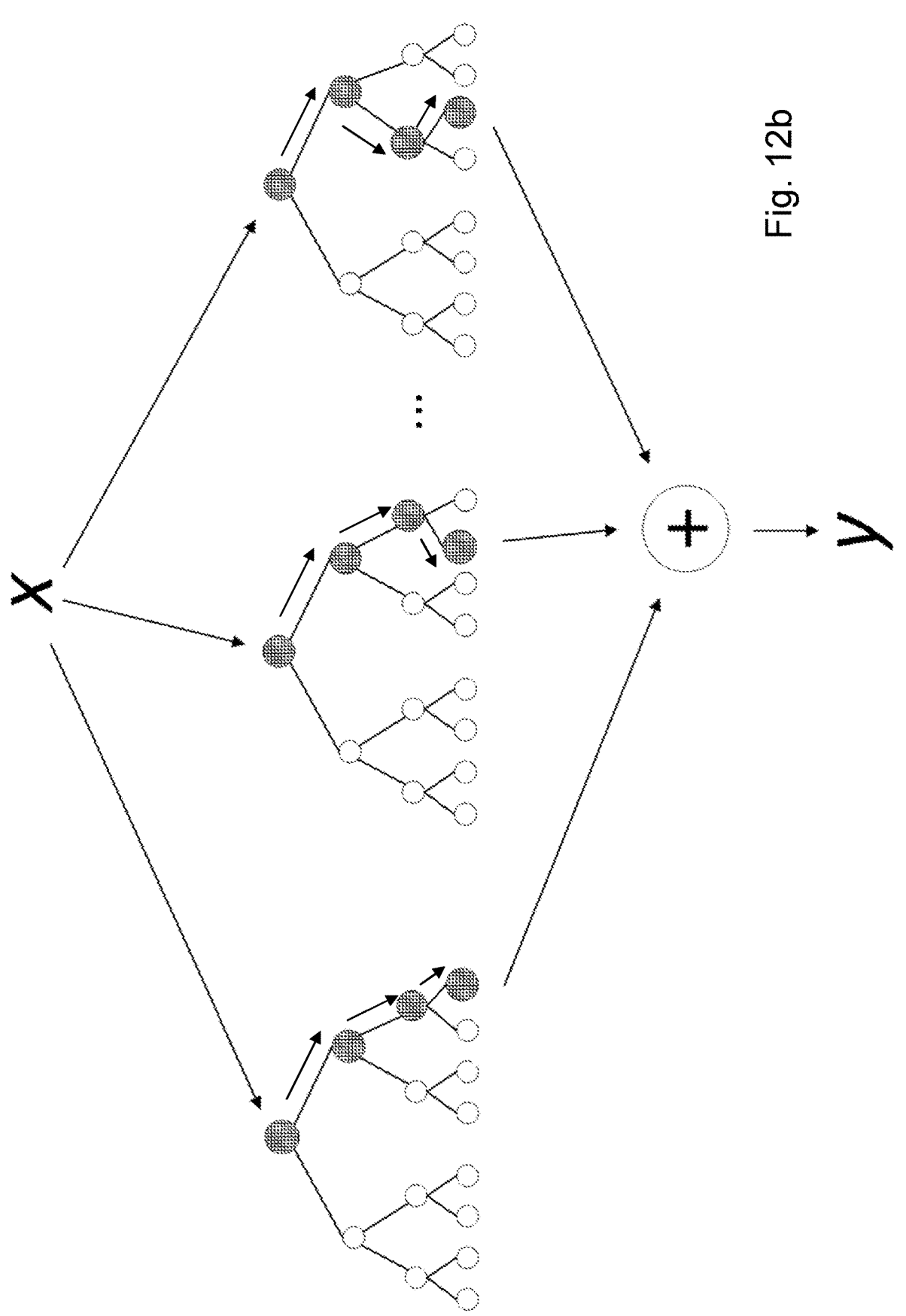

Random forest model. A set of decisions trees may be combined to form a random forest as shown in FIG. 12b.

Figures 12C, 12D:
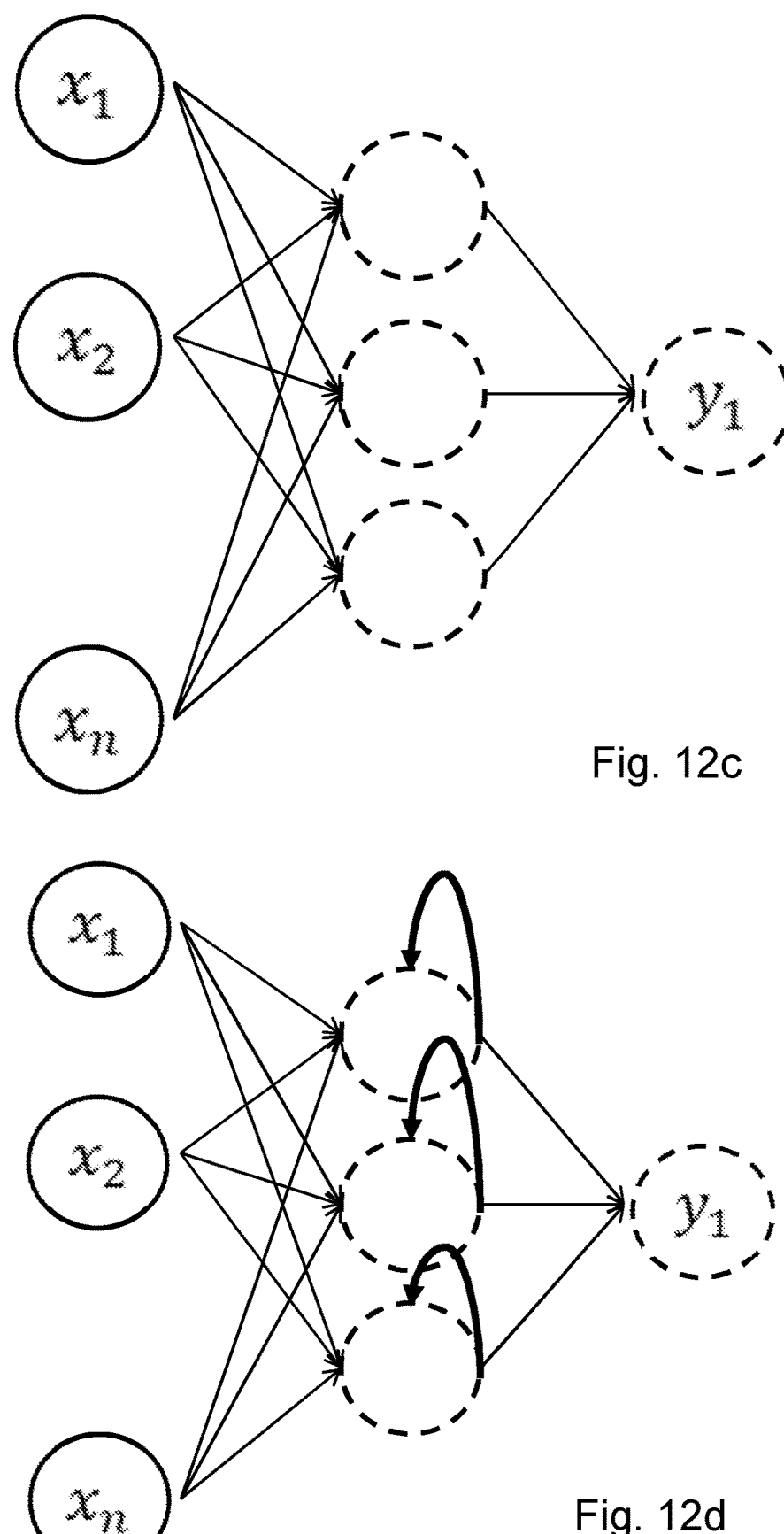

Neural Network. A neural network, as shown in FIG. 11c, comprises a set of neurons/activations connected by certain rules. An input layer is responsible for receiving the input data $x_1$ to $x_n$. The rightmost layer $y_1$ shown in FIG. 12c is referred to as the output layer, which receives the output data. The hidden layers in the middle of the multi-hop neural network compute a function of the inputs, which is not directly interfaced outside of the network. There is no connection between neurons in the same layer and each neuron on the nth layer is connected to all neurons on the (n−1)th layer. The output of the (n−1)th layer is the input of the nth layer. Each inter-neuron connection may have an associated multiplicative weight and each neuron in a layer may have an additive bias term. The FIG. 11c describes a feed-forward neural network. The model may also be of other neural networks types, such as e.g. a:

Long short-term memory (LSTM), or

Recurrent neural network (RNN) as shown in FIG. 12d.

In comparison to a feed-forward network, the LSTM and RNN also inputs what it has previously learned, which makes them accurate models for problems that inputs sequential data. Such as e.g. for a time-series of signal quality data points. The difference between LSTM and RNN is the memory size, where LSTM can efficiently handle inputs from a longer sequence, such as e.g. historical data.

Logistic regression model, and/or a

Nearest neighbor.

Network Actuation Based on the Learning

After the model has been trained, the signal quality prediction for the UE 120 may be used to:

Initiate inter-frequency and/or intra-frequency handover

Set handover/reselection parameters (in case it was not predicted in the previous step)

Change a UE scheduler priority, for example by scheduling the UE when the expected signal quality is good.

The network, such as the network node 110, may in some embodiments learn which polynomial that should trigger a UE report, e.g. which learnt input polynomial that corresponds to a certain future RSRP value, or a polynomial that indicates that the UE 120 will go out-of-coverage. The network node 110 may configure one or more polynomial(s) to the UE 120, and when the UE 120 matches with any of the configured polynomials, it may report the polynomial(s) to the network.

The learned polynomials may in another embodiment be used to set mobility states at the UE 120, for example if the polynomial coefficients match a specific criterion, such as e.g. when matching a speed state, the UE 120 may scale one or more of handover/reselection parameters. The speed state may e.g. be that the UE 120 is considered to be in a fast radio transition zone.

The parameters that may be scaled based on the speed state may e.g. be TTT and/or TReselection like in LTE. In some sub-embodiments, the scaling may also be applied to the Ax-offset, frequency specific offset, and/or different timers, such as e.g. a T310 timer as defined by 3GPP.

In yet another embodiment, beam failure detection parameters as well as radio link monitoring resources may be scaled. For example, a first parameter beamFailureInstanceMaxCount and a second parameter beamFailureDetectionTimer may be set to smaller values when the UE 120 is in a very fast changing radio environment, while they may be set to a greater values when the UE 120 is in a slow changing radio environment, to avoid unnecessary beam failure detection. In another example, the number of resources radioLinkMonitoringRS allocated to the radio link monitoring may comprise a set of up to 8 radio resources, such as e.g. SSB or CSI-RS or a mix of them, in FR2. The number of allocated resources for radio link monitoring may be scaled according to the changes in the radio environment.

Counter-Based Reporting

According to a further embodiment a counter-based reporting method may be used. In the counter-based reporting method the UE 120 periodically evaluates the RSRP, RSRQ, SINR and/or other measurements. The evaluation occasions may be defined in a specification or may be configured by the network, e.g. based on a Discontinuous Reception (DRX) cycle setting or specified explicitly or associated with each measurement occasion.

In comparison to the machine learning based model discussed above, this embodiment does not require the UE 120 to memorize the past RSRP samples (e.g. to create a polynomial), or reporting RSRP values periodically, but instead stores the historic info in a limited set of counters.

Evaluation Procedure

During each evaluation, the UE 120 may compare the measured signal quality value, such as e.g. RSRP, RSRQ or SINR, of the evaluation occasion with the measured signal quality value of the previous evaluation occasion. In the following RSRP will be used as an exemplary signal quality. If the signal quality value has decreased or increased by a predetermined threshold, which may be referred to as $Change_{Threshold}$, the evaluation result is considered as "decreased" or "increased". Otherwise, the result is considered as "unchanged".

The UE 120 may use a first counter, which may be referred to as $Num_{drop/increase}$, to record the number of evaluation occasions which are considered as "decreased" consecutively or "increased" consecutively.

In one embodiment, the UE 120 may reset the counter $Num_{drop/increase}$, to zero if the result of an evaluation is different from the previous one.

In another embodiment the UE 120 may reset the counter $Num_{drop/increase}$, to zero when the RSRP change values do not meet the $Change_{Threshold}$ criterion (see time instance 7 in the table).

In yet another embodiment, the UE 120 may reset the counter $Num_{drop/increase}$, to zero if up to 'X' time instances do not satisfy the $Change_{Threshold}$ criterion.

The UE 120 may further use a second counter, which may be referred to as $Total_{drop/increase}$, to record the accumulated differences between the RSRP values at adjacent evaluation occasions for the evaluation occasions which are considered as "decreased" consecutively or "increased" consecutively. When the $Num_{drop/increase}$ is reset to zero, the Totaldrop increase may also be reset to zero.

In one embodiment, the UE 120 may reset the counter $Total_{drop/increase}$, to zero if the result of an evaluation is different from the previous one. In other words, if the evaluation of the RSRP has shown a consecutive increase and the next evaluation shows a decrease the UE 120 may reset the counter.

In another embodiment the UE 120 may reset the counter $Total_{drop/increase}$, to zero when the RSRP change values do not meet the $Change_{Threshold}$ criterion (see time instance 7 in the table).

In yet another embodiment, the UE 120 may reset the counter $Total_{drop/increase}$, to zero if up to 'X' time instances do not satisfy the $Change_{Threshold}$ criterion.

Figure 13:
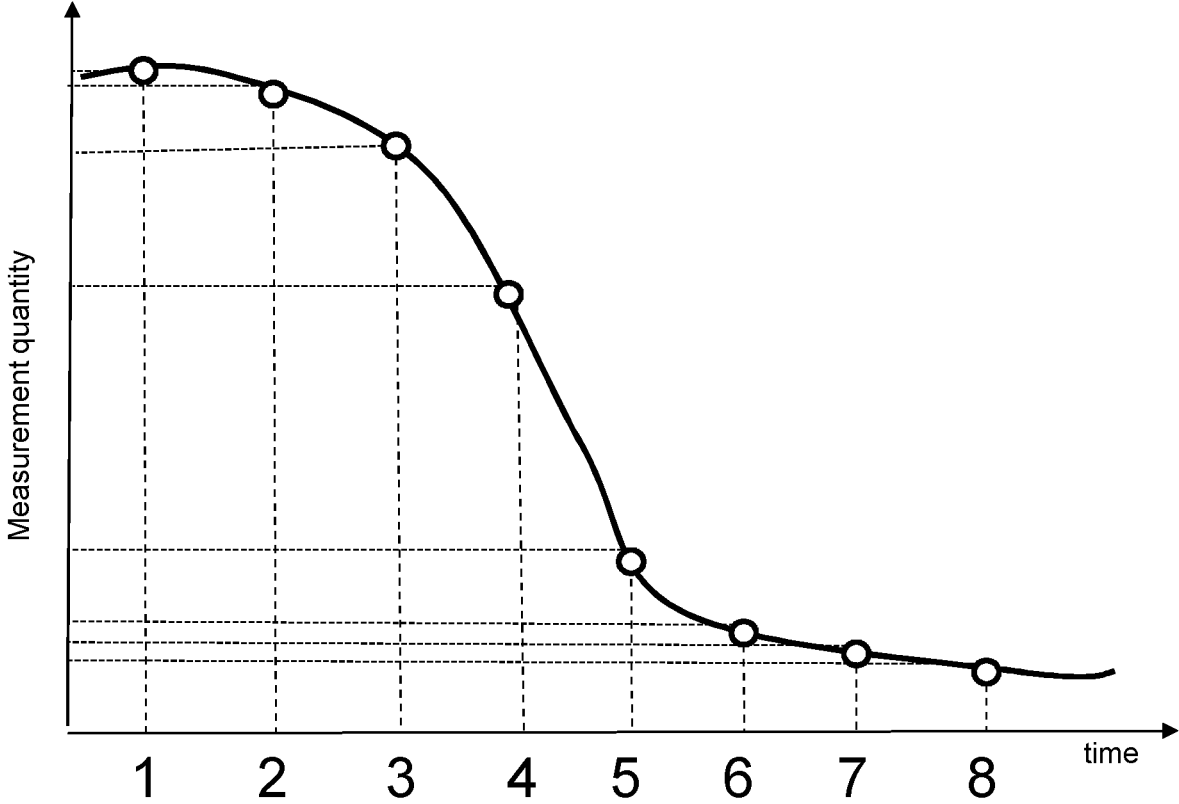
FIG. 13 illustrates a method for evaluating measurements for a plurality of evaluation occasions for a counter-based reporting method according to embodiments herein.

FIG. 13 shows UE measurements overtime for a certain measurement quantity, in this example RSRP. In each time sample where the UE 120 performs the RRM measurement, the UE 120 calculates the difference between the measurement quantities measured during the current evaluation occasion with the previous evaluation occasion.

$Total_{drop/increaseThreshold}$ the UE 120 may consider itself to be in fast radio transition zone. In yet another embodiment if the combinational value e.g., $Combined_{drop/increase} = (Total_{drop/increase}/Num_{drop/increase})$ goes above $Combined_{drop/increaseThreshold}$ the UE 120 may consider itself to be in a fast radio transition condition. Upon detecting that it is in fast radio transition zone, such as e.g. when the UE 120 turns around the corner in FIG. 2, the UE 120 may scale one or more of the handover/reselection parameters. This may be done in order compensate for the fast radio transition condition.

How the handover/reselection parameters and scaling coefficients should be set may be learned by the network, such as the network node 110, in a first phase (training phase). The network, such as the network node 110, may configure the UE 120 to request new handover or cell reselection parameters when the counter $Total_{drop/increase}$ goes above $Total_{drop/increaseThreshold}$ or when the counter $Combined_{drop/increase}$ goes above $Combined_{drop/increaseThreshold}$. Based on the teachings of the training phase the network node 110 may configure the UE 120 with the triggering conditions for triggering the UE reporting. In yet another embodiment, the setting of the handover/reselection parameters may be implemented in the UE 120 and hence there will be no need for any change on the network side.

For connected mode UEs 120, in one embodiment the measured samples used, such as e.g. RSRP samples, may be a Layer 3 (L3) filtered sample and in another embodiment this may be an unfiltered sample. Additionally, for idle and/or inactive UEs 120, this may be either actual measured samples at every DRX cycle or samples based on filtering.

It should be noted that although the above embodiments are described with RSRP as the measurement quantity other measurement quantities such as e.g. RSRQ or SINR or other quantities may also be used.

| Evaluation occasion | Measured quantity (RSRP) | $Num_{drop/increase}$ | $Total_{drop/increase}$ | $Combined_{drop/increase}$ |
|---|---|---|---|---|
| 1 | −101 dB | 0 | 0 | 0 |
| 2 | −102 dB | 0 | 0 | 0 |
| 3 | −103.5 dB | 1 | 1.5 dB | 1.5 |
| 4 | −106 dB | 2 | 4 dB | 2 |
| 5 | −110 dB | 3 | 8 dB | 8/3 |
| 6 | −111.5 dB | 4 | 9.5 dB | 9.5/4 |
| 7 | −112 dB | 0 | 0 | 0 |
| 8 | −112.2 dB | 0 | 0 | 0 |

In the example shown in FIG. 13 and in the table above, the RSRP changes towards a cell or a beam of the network over time for a UE 120 is shown. In addition, the network may provide threshold values, such as e.g., $Change_{Threshold} >= 1.5$ dB, $Num_{drop/increaseThreshold} = 3$ and $Total_{drop/increaseThreshold} = 5$. There may also be other combinational thresholds such as e.g. $Combined_{drop/increaseThreshold} = (Total_{drop/increaseThreshold}/Num_{drop/increaseThreshold}) = 5/3$.

The counter Numdrop/increase at the UE 120 may be incremented when the measured RSRP sample falls below or rises above the Change Threshold. Whenever the counter $Num_{drop/increase}$ is incremented, the actual change in RSRP may be accumulated in the $Total_{drop/increase}$ counter. In one embodiment, when the value of the counter $Num_{drop/increase}$ goes above $Num_{drop/increaseThreshold}$ and/or when the value of the counter $Total_{drop/increase}$ goes above In some embodiments, there may be further thresholds that aid the UE 120 to classify itself under different classes, which may also be referred to as mobility states. These may e.g. be very fastly changing, fastly changing or normally changing classes. There may however also be more than just three different classes for the UE. In such case, the network, such as the network node 110, may provide threshold values to be used for each of these classes. The different mobility states of the UE 120 may be determined according to the following rules as defined in 3GPP TS 38.304 v. 15.1.0 shown below:

5.2.4.3 Mobility States of a UE 5.2.4.3.0 Introduction

The UE mobility state is determined if the parameters ($T_{CRmax}$, $N_{CR\_H}$, $N_{CR\_M}$ and $TCR_{maxHyst}$) are broadcasted in system information for the serving celL State Detection Criteria:

Normal-Mobility State Criteria:

If number of cell reselections during time period $T_{CRmax}$ is less than $N_{CR\_M}$.

Medium-Mobility State Criteria:

If number of cell reselections during time period $T_{CRmax}$ is greater than or equal to $N_{CR\_M}$ but less than $N_{CR\_H}$.

High-Mobility State Criteria:

If number of cell reselections during time period $T_{CRmax}$ is greater than $N_{CR\_H}$.

The UE shall not consider consecutive reselections where a cell is reselected again right after one reselection for mobility state detection criteria.

State Transitions:

The UE shall:

if the criteria for High-mobility state is detected:

enter High-mobility state.

else if the criteria for Medium-mobility state is detected:

enter Medium-mobility state.

else if criteria for either Medium- or High-mobility state is not detected during time period $TCR_{maxHyst}$ enter Normal-mobility state.

If the UE is in High- or Medium-mobility state, the UE shall apply the Speed dependent scaling rules as defined in subclause 5.2.4.3.1.

5.2.4.3.1 Scaling Rules

UE shall apply the following scaling rules:

If neither Medium- nor High-mobility state is detected:

no scaling is applied.

If High-mobility state is detected:

Add the sf-High of "Speed dependent ScalingFactor for $Q_{hyst}$" to $Q_{hyst}$ if broadcasted in system information;

For NR cells, multiply $Treselection_{EUTRA}$ by the sf-High of "Speed dependent ScalingFactor for Treselection$_{EUTRA}$" if broadcasted in system information;

For EUTRA cells, multiply $Treselection_{EUTRA}$ by the sf-High of "Speed dependent ScalingFactor for Treselection$_{EUTRA}$" if broadcasted in system information.

If Medium-mobility state is detected:

Add the sf-Medium of "Speed dependent ScalingFactor for $Q_{hyst}$" to $Q_{hyst}$ if broadcasted in system information;

For example, in order to classify itself in the very fastly changing class, the UEs measured RSRP should fulfill $Change_{Threshold/VeryFast}$, $Num_{drop/increaseThresholdVeryFast}$ and $Total_{drop/increaseThreshold/VeryFast}$ threshold based conditions. Similarly, in order to classify itself in the fastly changing class, the UEs measured RSRP should fulfill $Change_{ThresholdFast}$, $Num_{drop/increaseThresholdFast}$ and $Total_{drop/increaseThresholdFast}$ threshold based conditions. Also, in order to classify itself in the normally changing class, the UEs measured RSRP should fulfill $Change_{ThresholdNormal}$, $Num_{drop/increaseThresholdNormal}$ and $Total_{drop/increaseThresholdNormal}$ threshold based conditions.

The thresholds mentioned above may either be network configured, fixed in the 3GPP standard or may be up to UE implementation. In the case of the network configured embodiment, these thresholds may be either dedicatedly provided to each UE 120, such as e.g. as part of measConfig or measObject.or some other IE, or may be broadcasted, such as e.g. in SIB2/SIB4. In the following the measConfig related configuration is shown in addition to a new IE referred to as RadioChangeMonitoringConfig.

| MeasConfig information element |
|---|

```
-- ASN1START
-- TAG-MEAS-CONFIG-START
MeasConfig ::=                              SEQUENCE {
       measObjectToRemovelist                  MeasObjectToRemoveList
OPTIONAL,    -- Need N
       measObjectToAddModList                  MeasObjectToAddModList
OPTIONAL,    -- Need N
       reportConfigToRemoveList                ReportConfigToRemoveList
OPTIONAL,    -- Need N
       reportConfigToAddModList                ReportConfigToAddModList
OPTIONAL,    -- Need N
       measIdToRemoveList                      MeasIdToRemoveList
OPTIONAL,    -- Need N
       measIdToAddModList                      MeasIdToAddModList
OPTIONAL,    -- Need N
       s-MeasureConfig                         CHOICE {
            ssb-RSRP                                RSRP-Range,
            csi-RSRP                                RSRP-Range
       }
OPTIONAL,    -- Need M
       quantityConfig                          QuantityConfig
OPTIONAL,    -- Need M
       measGapConfig                           MeasGapConfig
OPTIONAL,    -- Need M
       measGapSharingConfig                        MeasGapSharingConfig
OPTIONAL,    -- Need M ...,
       radioChangeMonitoringConfig                 RadioChangeMonitoringConfig
OPTIONAL,    -- Need M
}
MeasObjectToRemoveList ::=                   SEQUENCE (SIZE (1..maxNrofObjectId)) OF
MeasObjectId
MeasIdToRemoveList ::=                       SEQUENCE (SIZE (1..maxNrofMeasId)) OF MeasId
ReportConfigToRemoveList ::=                 SEQUENCE (SIZE (1..maxReportConfigId)) OF
ReportConfigId
-- TAG-MEAS-CONFIG-STOP
-- ASN1STOP
```

RadioChangeMonitoringConfig

The IE RadioStateScaleFactors concerns thresholds, to be used to classify the UE as a very fast changing, fast changing or normally changing radio condition by the UE.

to, e.g. by means of the obtaining unit 1450 being configured to, obtain information regarding signal quality measurements for a plurality of time instances for the second UE 120*b*.

| RadioChangeMonitoringConfig information element |
|---|
| -- ASN1START |
| -- TAG-RADIOCHANGEMONITORINGCONFIG-START |

```
RadioChangeMonitoringConfig ::=          SEQUENCE {
    veryFastChanging                     SEQUENCE {
        Change_{ThresholdVeryFast}       ENUMERATE {oDo:25, oDot5, oDot75, 1Dot0, 1Dot25,
1Dot5, 1Dot75, 2Dot0, 2Dot25, 2Dot5, 2Dot75, 3Dot0},
            Num_{drop/increaseThresholdVeryFast}     INTEGRE (1....32),
            Total_{drop/increaseThresholdVeryFast}   RSRP-range
        },
    fastChanging                         SEQUENCE {
        Change_{ThresholdFast}           ENUMERATE {oDot25, oDet5, oDot75, 1Dot0, 1Dot25, 1Dot5,
1Dot75, 2Dot0, 2Dot25, 2Dot5, 2Dot75, 3Dot0},
            Num_{drop/increaseThresholdFast}         INTEGRE (1....32),
            Total_{drop/increaseThresholdFast}       RSRP-range
        },
    normalChanging                       SEQUENCE {
        Change_{ThresholdNormal}         ENUMERATE { oDot25, oDot5, oDot75, 1Dot0, 1Dot25, 1Dot5,
1Dot75, 2Dot0, 2Dot25, 200=5, 2Dot75, 3Dot0},
            Num_{drop/increaseThresholdNormal}       INTEGRE (1....32),
            Total_{drop/increaseThresholdNormal}     RSRP-range
        }
}
```

-- TAG- RADIOCHANGEMONITORINGCONFIG -STOP
-- ASN1STOP

Figure 14A:
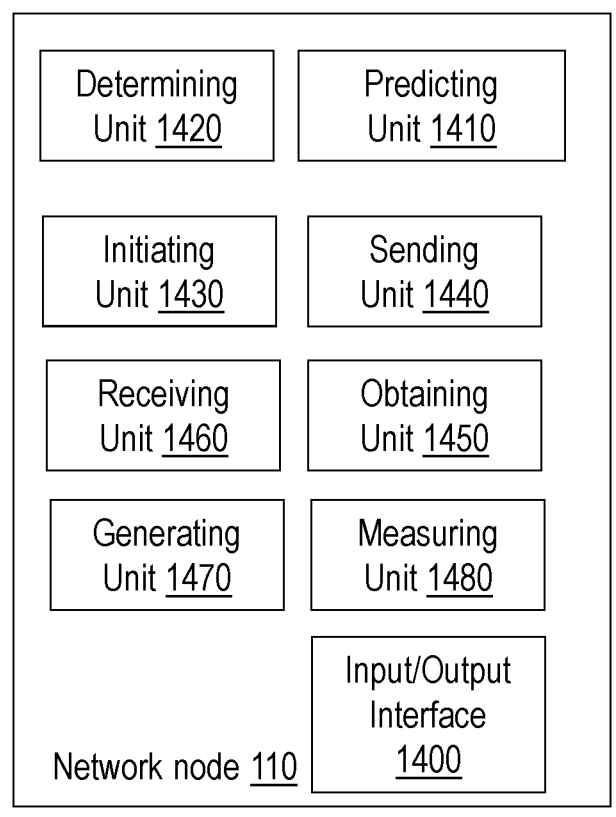
FIG. 14*a* is a schematic block diagram illustrating some first embodiments of a network node.
Figure 14B:
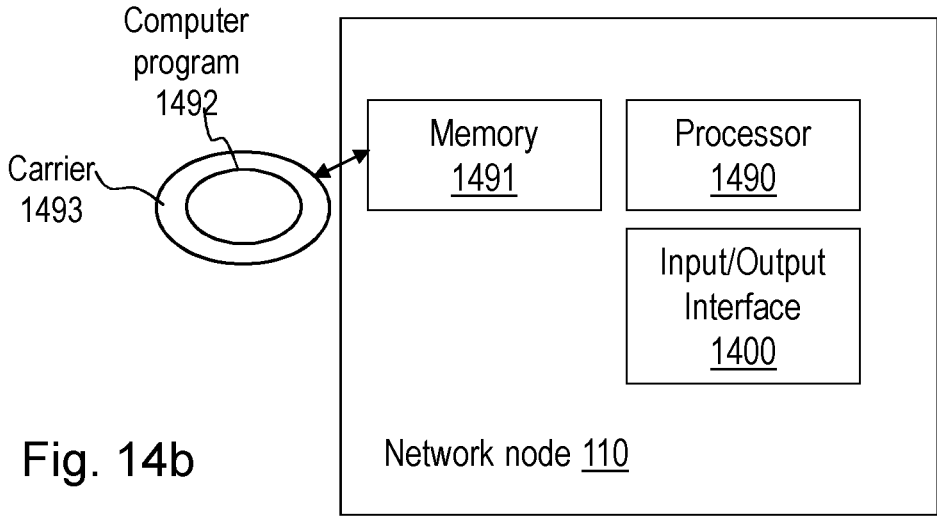
FIG. 14*b* is a schematic block diagram illustrating some second embodiments of the network node.

To perform the method actions above for handling signal quality variations for the UE 120 in the communications network 100, the network node 110 may comprise the arrangement depicted in FIGS. 14*a* and 14*b*.

The network node 110 may comprise an input and output interface 1400 configured to communicate e.g. with the UEs 120*a*, 120*b*. The input and output interface 1400 may comprise a wireless receiver (not shown) and a wireless transmitter (not shown).

The network node 110 may further comprise a predicting unit 1410, a determining unit 1420, an initiating unit 1430, a sending unit 1440, an obtaining unit 1450, a receiving unit 1460, a generating unit 1470, and/or a measuring unit 1480.

The network node 110 is configured to, e.g. by means of the predicting unit 1410 being configured to, predict, based on historical data of previous signal quality variations for one or more first UEs 120*a* having been served by the network node 110, a future signal quality variation for a second UE 120*b* being served by the network node 110, wherein the historical data of previous signal quality variations is indicative of a path of movement of the one or more first UEs 120*a*.

The network node 110 is configured to, e.g. by means of the determining unit 1420 being configured to, determine to change a network configuration for the second UE 120*b* based on the predicted signal quality variation.

The network node 110 is configured to, e.g. by means of the initiating unit 1430 being configured to, initiate the change of the network configuration for the second UE 120*b*.

The network node 110 is configured to, e.g. by means of the sending unit 1440 being configured to, send, to the second UE 120*b*, an indication to change the network configuration.

In order to predict the signal quality variation for the second UE 120*b*, the network node 110 may be configured In order to predict the signal quality variation for the second UE 120*b*, the network node 110 may further be configured to, e.g. by means of the determining unit 1420 being configured to, determine, based on the obtained information regarding signal quality measurements from the second UE 120*b*, a signal quality of the second UE 120*b* at a future time instance using a predictive model generated based on historical data of obtained signal quality measurements indicative of a path of movement for the one or more first UEs 120*a*.

The network node 110 may be configured to, e.g. by means of the obtaining unit 1450 being configured to, obtain information regarding a plurality of signal quality measurements for different time instances for the one or more first UEs 120*a*.

The network node 110 may be configured to, e.g. by means of the generating unit 1470 being configured to, generate a predictive model for an obtained signal quality measurement from each of the one or more first UEs 120*a* at a time instance, based on the obtained signal quality measurements received from each of the one or more first UEs 120*a* at one or more previous time instances, wherein the signal quality measurements are indicative of a path of movement of the one or more first UEs 120*a*.

The network node 110 may be configured to, e.g. by means of the obtaining unit 1450 or the receiving unit 1460 being configured to, obtain the signal quality by receiving, from the one or more first UEs 120*a* and/or the second UE 120*b*, DL measurements of the signal quality for each of the one or more first UEs 120*a* and/or the second UE 120*b*.

The network node 110 may be configured to, e.g. by means of the obtaining unit 1450 or the measuring unit 1480 being configured to, obtain the signal quality by performing UL measurements of the signal quality for each of the one or more first UEs 120*a* and/or the second UE 120*b*.

The network node 110 may be configured to, e.g. by means of the obtaining unit 1450 being configured to, obtain the signal quality measurements for the one or more first UEs 120a and the second UE 120b as a polynomial representing the measured signal qualities.

The network node 110 may be configured to, e.g. by means of the obtaining unit 1450 being configured to, obtain the signal quality measurements for the one or more first UEs 120a and/or the second UE 120b as a plurality of measurements.

The network node 110 may be configured to, e.g. by means of the obtaining unit 1450 being configured to, obtain the signal quality measurements for the one or more first UEs 120a and the second UE 120b as a number of subsequent measurement occasions in which the measured signal quality has consecutively increased above a predetermined threshold or decreased below a predetermined threshold.

The network node 110 may be configured to, e.g. by means of the predicting unit 1410 being configured to, predict the future signal quality variation using a machine learning based model which is trained based on historical data of previous signal quality variations.

The network node 110 may be configured to, e.g. by means of the predicting unit 1410 being configured to, predict the future signal quality variation using a machine learning based model such as one or more of a decision tree model, random forest of decision trees model, neural network, nearest neighbor model, and/or logistic regression model.

The network node 110 is configured to, e.g. by means of the initiating unit 1430 being configured to, initiate the change of the network configuration by sending, to the second UE 120b, an indication to change the network configuration.

The network node 110 is configured to, e.g. by means of the initiating unit 1430 being configured to, indicate to the second UE 120b to change the network configuration for the second UE 120b by initiating an inter-frequency handover, initiating an intra-frequency handover, and/or setting handover/reselection parameters.

The network node 110 is configured to, e.g. by means of the initiating unit 1430 being configured to, initiate the change of the network configuration by changing a scheduling priority for the second UE 120b.

The embodiments herein may be implemented through a respective processor or one or more processors, such as a processor 1490 of a processing circuitry in the network node 110 depicted in FIG. 14b, together with a respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1491 comprising one or more memory units. The memory comprises instructions executable by the processor 1490. The memory 1491 is arranged to be used to store e.g. information about the beam-specific signal quality, channel estimation parameters and channel estimation methods, adapted channel estimation parameters and the channel estimation methods, covariance estimation parameters and covariance estimation methods for the received signal, adapted covariance estimation parameters and adapted covariance estimation methods, a covariance matrix, one or more elements of a covariance matrix, and the first and second threshold, and applications to perform the methods herein when being executed in the network node 110.

Those skilled in the art will also appreciate that the units in the network node 110 mentioned above may refer to a combination of analog and digital circuits, and/or one or more processors configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 1492 comprises instructions, i.e., software code portions, which when executed by the respective at least one processor 1490, cause the at least one processor 1490 of the network node 110 to perform the actions according to the embodiments described above for the network node 110.

In some embodiments, a carrier 1493 comprises the computer program 1492, wherein the carrier 1493 is one of an electronic signal, an optical signal, an electromagnetic signal, a magnetic signal, an electric signal, a radio signal, a microwave signal, or a computer-readable storage medium.

The network node 110, 120 described in the embodiments herein may also be implemented in a cloud. Although the method actions performed by the network node 110 herein are discussed in the context of a network node, such as e.g. a radio network node, the method may also be performed by a core network node or a distributed node comprised in a first cloud, such as e.g. a server and/or a data center. The method actions may e.g. be performed by a logical function, which may be a centralized service hosted on the network device or the distributed node.

Figure 15A:
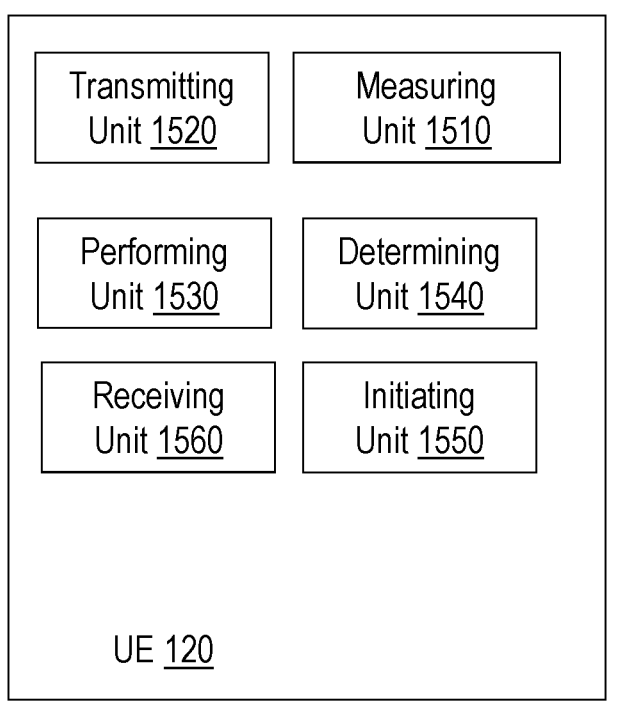
FIG. 15*a* is a schematic block diagram illustrating some first embodiments of a UE.
Figure 15B:
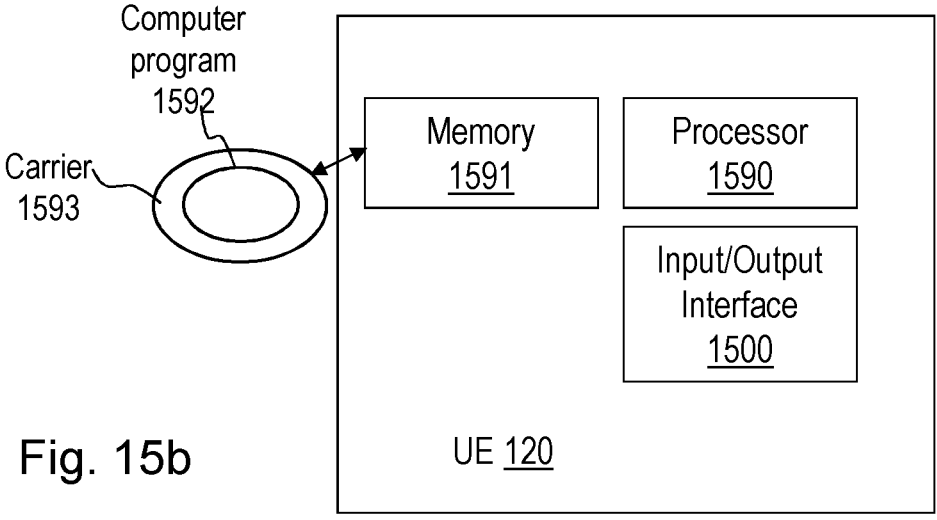
FIG. 15*b* is a schematic block diagram illustrating some second embodiments of the UE.

To perform the method actions above for handling signal quality variations for the UE 120 in the communications network 100, the UE 120, such as the first UE 120a or the second UE 120b, may comprise the arrangement depicted in FIGS. 15a and 15b.

The UE 120; 120a, 120b may comprise an input and output interface 1500 configured to communicate e.g. with the network node 110. The input and output interface 1500 may comprise a wireless receiver (not shown) and a wireless transmitter (not shown).

The UE 120; 120a, 120b may further comprise a measuring unit 1510, a transmitting unit 1520, a performing unit 1530, a determining unit 1540, an initiating unit 1550, and/or a receiving unit 1560.

The UE 120; 120a, 120b is configured to, e.g. by means of the measuring unit 1510 being configured to, measure the signal quality at a plurality of time instances.

The UE 120; 120a, 120b is configured to, e.g. by means of the transmitting unit 1520 being configured to, transmit, to the network node 110, information related to the plurality of signal quality measurements at different time instances, wherein the information related to the plurality of signal quality measurements is indicative of a path of movement of the UE 120a, 120b.

The UE 120; 120a, 120b is configured to, e.g. by means of the performing unit 1530 being configured to, perform an action related to a change of the network configuration for a future time instance based on an indication received from the network node 110, wherein the action is dependent on a future signal quality of the UE 120a, 120b predicted by the network node 110.

The UE 120; 120a, 120b may be configured to, e.g. by means of the determining unit 1540 being configured to, determine, based on the measured signal quality, a polynomial representing the measured signal qualities over the plurality of time instances.

The UE 120; 120a, 120b may be configured to, e.g. by means of the transmitting unit 1520 being configured to, transmit the signal quality measurements as the determined polynomial.

The UE 120; 120a, 120b may be configured to, e.g. by means of the determining unit 1540 being configured to, determine, based on the measured signal quality, the number of subsequent measuring occasions in which the measured signal quality has consecutively increased or decreased.

The UE 120; 120a, 120b may be configured to, e.g. by means of the performing unit 1530 being configured to, perform the action related to the change of the network configuration when the number of subsequent measuring occasions in which the measured signal quality has consecutively increased or decreased is above a predetermined threshold.

The UE 120; 120a, 120b may be configured to, e.g. by means of the performing unit 1530 and/or the initiating unit 1550 being configured to, perform one or more of the following actions related to the change of the network configuration initiating an inter-frequency handover, initiating an intra-frequency handover, and/or changing handover/ reselection parameters.

The UE 120; 120a, 120b may be configured to, e.g. by means of the receiving unit 1560 being configured to, receive, from the network node 110, an indication to change a network configuration for a future time instance.

The embodiments herein may be implemented through a respective processor or one or more processors, such as a processor 1590 of a processing circuitry in the UE 120; 120a, 120b depicted in FIG. 15b, together with a respective computer program code for performing the functions and actions of the embodiments herein. The program code mentioned above may also be provided as a computer program product, for instance in the form of a data carrier carrying computer program code for performing the embodiments herein when being loaded into the UE 120; 120a, 120b. One such carrier may be in the form of a CD ROM disc. It is however feasible with other data carriers such as a memory stick. The computer program code may furthermore be provided as pure program code on a server and downloaded to the UE 120; 120a, 120b.

The UE 120; 120a, 120b may further comprise a memory 1591 comprising one or more memory units. The memory comprises instructions executable by the processor 1590. The memory 1591 is arranged to be used to store e.g. information about the beam-specific signal quality, channel estimation parameters and channel estimation methods, adapted channel estimation parameters and the channel estimation methods, covariance estimation parameters and covariance estimation methods for the received signal, adapted covariance estimation parameters and adapted covariance estimation methods, a covariance matrix, one or more elements of a covariance matrix, and the first and second threshold, and applications to perform the methods herein when being executed in the UE 120; 120a, 120b.

Those skilled in the art will also appreciate that the units in the UE 120; 120a, 120b mentioned above may refer to a combination of analog and digital circuits, and/or one or more processors configured with software and/or firmware, e.g. stored in the UE 120; 120a, 120b that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 1592 comprises instructions, i.e., software code portions, which when executed by the respective at least one processor 1590, cause the at least one processor 1590 of the UE 120; 120a, 120b to perform the actions according to the embodiments described above for the UE 120; 120a, 120b.

In some embodiments, a carrier 1593 comprises the computer program 1592, wherein the carrier 1593 is one of an electronic signal, an optical signal, an electromagnetic signal, a magnetic signal, an electric signal, a radio signal, a microwave signal, or a computer-readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the UE or the network node.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/ or program or application data, and non-volatile memory. Other hardware, conventional and/or custom, may also be included. Designers of network nodes or devices will appreciate the cost, performance, and maintenance trade-offs inherent in these design choices.

Further Extensions and Variations

Figure 16:
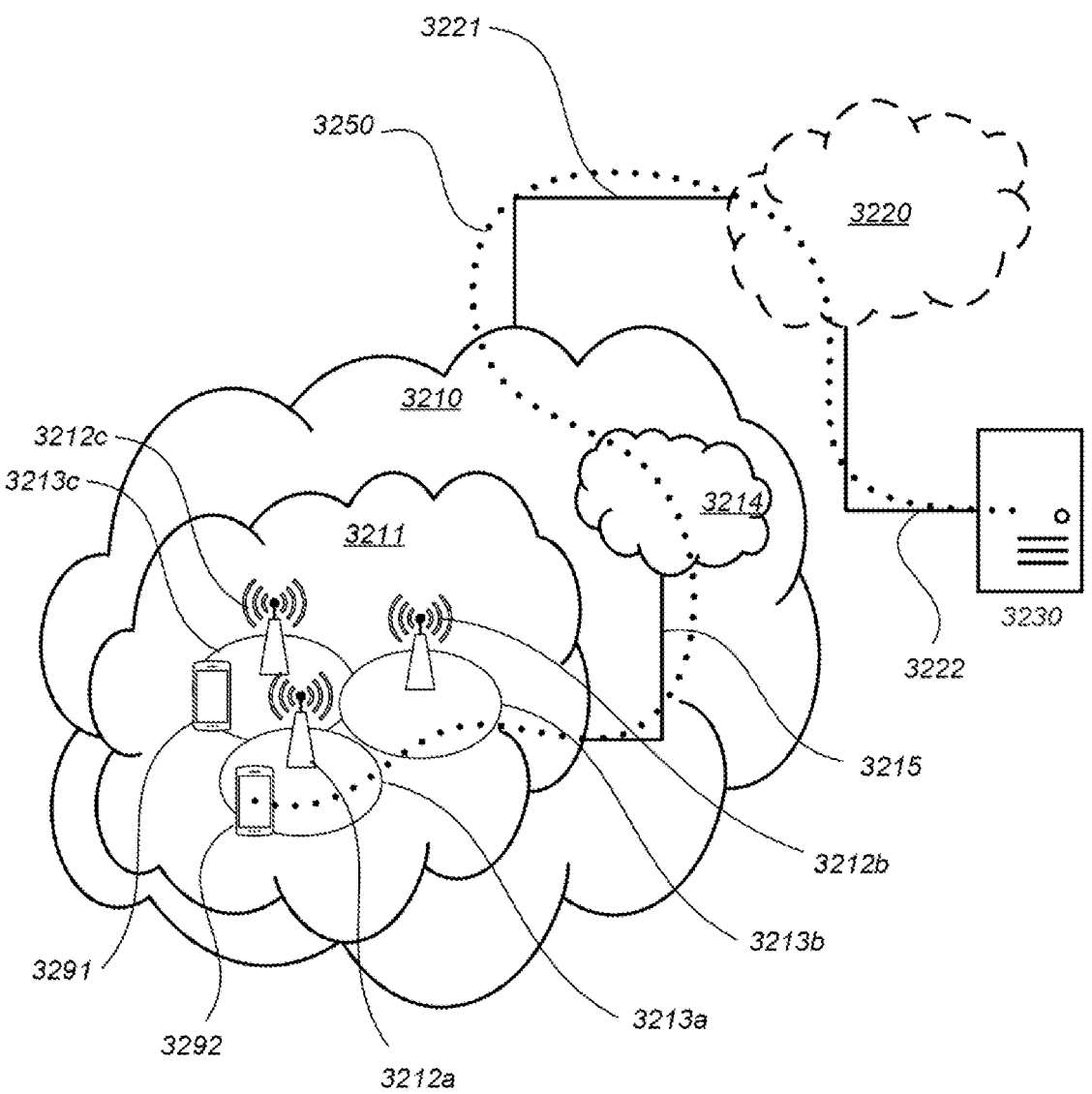
FIG. 16 is a schematic block diagram illustrating a host computer communicating via a base station with a user equipment over a partially wireless connection in accordance with some embodiments.

With reference to FIG. 16, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the first or second radio node 110, 120, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the first or second radio node 110, 120 or such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 17. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 17) served by the base station 3320. The communication interface 3326 may be configured to facilitate a connection 3360 to the host computer 3310. The connection 3360 may be direct or it may pass through a core network (not shown in FIG. 17) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 17:
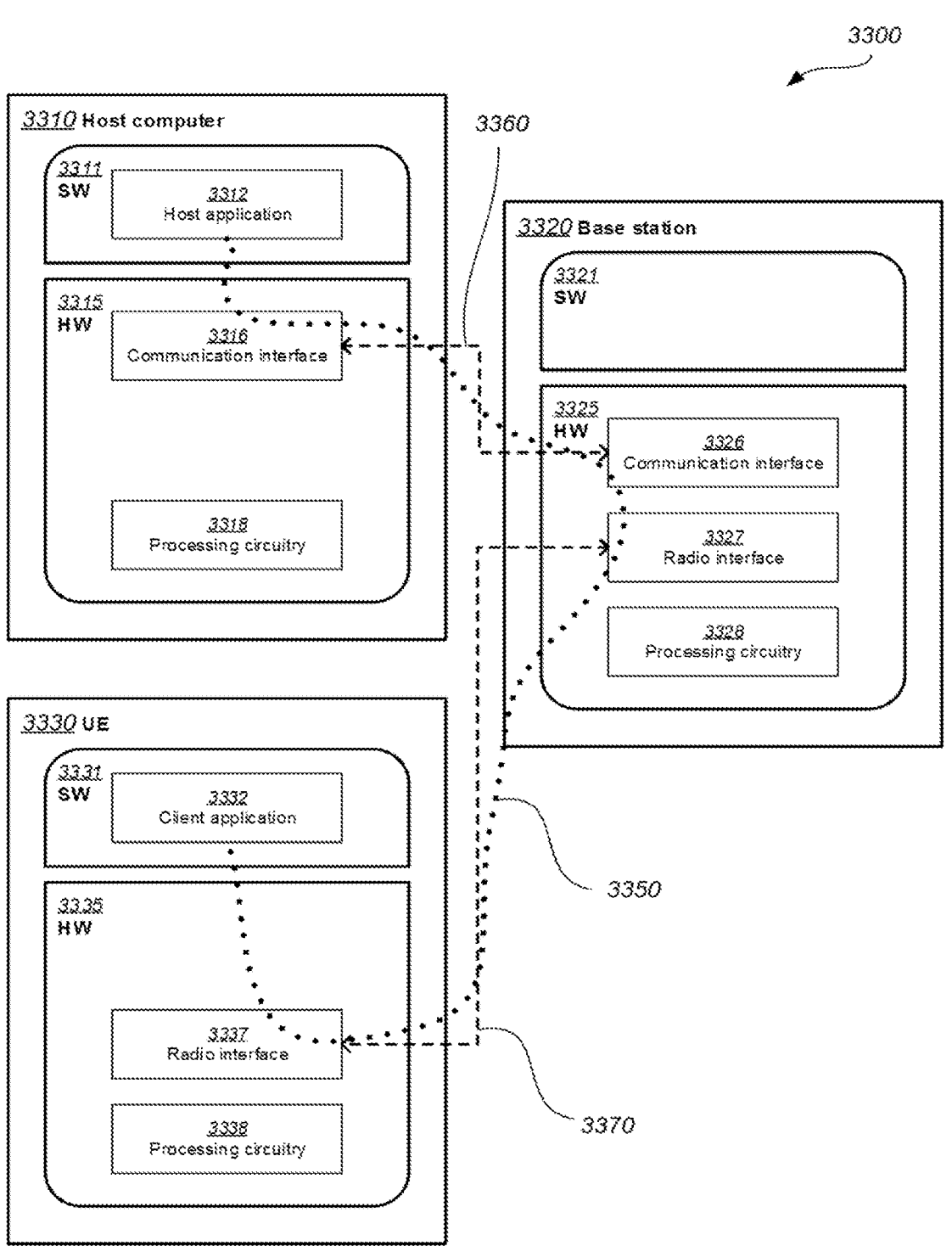
FIG. 17 is a schematic overview of a host computer communicating via a base station with a user equipment over a partially wireless connection in accordance with some embodiments.

It is noted that the host computer 3310, base station 3320 and UE 3330 illustrated in FIG. 17 may be identical to the host computer 3230, one of the base stations 3212*a*, 3212*b*, 3212*c* and one of the UEs 3291, 3292 of FIG. 16, respectively. This is to say, the inner workings of these entities may be as shown in FIG. 17 and independently, the surrounding network topology may be that of FIG. 16.

In FIG. 17, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, by predicting a drop in signal quality for a UE and performing mobility measurements and/or a handover to a network node providing better signal quality, the data rate, latency, power consumption may be improved and thereby provide benefits such as user waiting time, relaxed restriction on file size, better responsiveness and extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 18 is a flowchart illustrating a method implemented in a communication system, in accordance with one embodiment. The communication system includes a host computer, a base station such as a AP STA, and a UE such as a Non-AP STA which may be those described with reference to FIGS. 16 and 17. For simplicity of the present disclosure, only drawing references to FIG. 18 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 19 is a flowchart illustrating a method implemented in a communication system, in accordance with one embodiment. The communication system includes a host computer, a base station such as a AP STA, and a UE such as a Non-AP STA which may be those described with reference to FIGS. 16 and 17. For simplicity of the present disclosure, only drawing references to FIG. 19 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 20, 21:
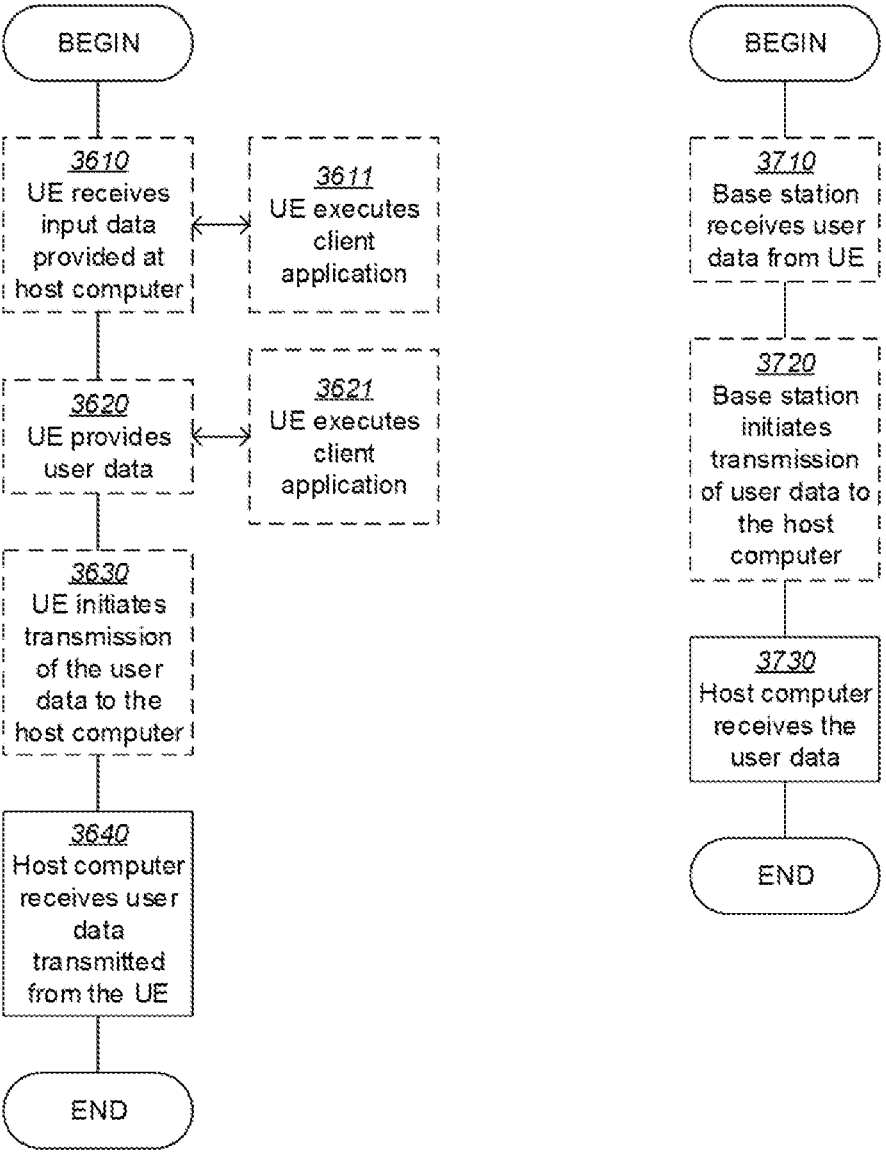
FIG. 20 is a flowchart depicting methods implemented in a communication system including a host computer, a base station and a user equipment in accordance with some embodiments.
FIG. 21 is a flowchart depicting methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station such as a AP STA, and a UE such as a Non-AP STA which may be those described with reference to FIGS. 16 and 17. For simplicity of the present disclosure, only drawing references to FIG. 20 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station such as a AP STA, and a UE such as a Non-AP STA which may be those described with reference to FIGS. 16 and 17. For simplicity of the present disclosure, only drawing references to FIG. 21 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Embodiments herein may further relate to:

1. A network node (110) for handling signal quality variations for a User Equipment, UE, comprising a processor and a memory, said memory containing instructions executable by said processor wherein said network node (110) is operative to:

predict, based on historical data of previous signal quality variations for one or more first UEs having been served by the network node (110), a future signal quality variation for a second UE being served by the network node (110), wherein the historical data of previous signal quality variations is indicative of a path of movement of the one or more first UEs, determine to change a network configuration for the second UE based on the predicted signal quality variation, initiate the change of the network configuration for the second UE.

2. The network node (110) according to paragraph 1, wherein the network node (110) further is operative to:

obtain information regarding signal quality measurements for a plurality of time instances for the second UE, determine, based on the obtained information regarding signal quality measurements from the second UE, a signal quality of the second UE at a future time instance using a predictive model generated based on historical data of obtained signal quality measurements indicative of a path of movement for the one or more first UEs.

3. The network node (100) according to paragraph 1 or 2, wherein the network node (100) further is operative to:

obtain information regarding a plurality of signal quality measurements for different time instances for the one or more first UEs, generate a predictive model for an obtained signal quality measurement from each of the one or more first UEs at a time instance, based on the obtained signal quality measurements received from each of the one or more first UEs at one or more previous time instances, wherein the signal quality measurements are indicative of a path of movement of the one or more first UEs.

4. The network node (110) according to paragraph 2 or paragraph 3 when dependent on paragraph 2, wherein the network node (110) is further operative to:

obtain the signal quality by receiving, from the one or more first UEs and/or the second UE, downlink, DL, measurements of the signal quality for each of the one or more first UEs and/or the second UE.

5. The network node (110) according to paragraph 2 or paragraph 3 when dependent on paragraph 2, wherein the network node (110) is further operative to:

obtain the signal quality by performing uplink, UL, measurements of the signal quality for each of the one or more first UEs and/or the second UE.

6. The network node (110) according to any of the paragraphs 2 to 5, wherein the network node (110) is further operative to obtain the signal quality measurements for the one or more first UEs and the second UE as a polynomial representing the measured signal qualities.

7. The network node (110) according to any of the paragraphs 2 to 5, wherein the network node (110) is further operative to obtain the signal quality measurements for the one or more first UEs and the second UE as a plurality of measurements.

8. The network node (110) according to any of the paragraphs 2 to 5, wherein the network node (110) is further operative to obtain the signal quality measurements for the one or more first UEs and the second UE as a number of subsequent measurement occasions in which the measured signal quality has consecutively increased above a predetermined threshold or decreased below a predetermined threshold.

9. The network node (110) according to any of the paragraphs 1 to 8, wherein the network node (110) is further operative to predict the future signal quality variation using a machine learning based model which is trained based on historical data of previous signal quality variations.

10. The network node (110) according to any of the paragraphs 1 to 9, wherein the network node (110) is further operative to predict the future signal quality variation using a machine learning based model such as one or more of a:

decision tree model, random forest of decision trees model, neural network, nearest neighbor model, and/or logistic regression model.

11. The network node (110) according to any of the paragraphs 1 to 9, wherein the network node (110) is further operative to initiate the change of the network configuration by sending, to the second UE, an indication to change the network configuration.

12. The network node (110) according to any of the paragraphs 11, wherein the network node (110) is further operative to indicate to the second UE to change the network configuration for the second UE by:

initiating an inter-frequency handover, initiating an intra-frequency handover, and/or setting handover/reselection parameters.

13. The network node (110) according to any of the paragraphs 1 to 9, wherein the network node (110) is further operative to initiate the change of the network configuration by changing a scheduling priority for the second UE.

14. A User Equipment, UE, (120), for performing a method for handling signal quality variations for the UE (120), comprising a processor and a memory, said memory containing instructions executable by said processor wherein said UE (120) is operative to:

measure the signal quality at a plurality of time instances, transmit, to a network node (110), information related to the plurality of signal quality measurements at different time instances, wherein the information related to the plurality of signal quality measurements is indicative of an path of movement of the UE (120), perform an action related to a change of the network configuration for a future time instance based on an indication received from the network node (110), wherein the action is dependent on a future signal quality of the UE (120) predicted by the network node (110).

15. The UE (120) according to paragraph 14, wherein the UE (120) is further operative to:

determine, based on the measured signal quality, a polynomial representing the measured signal qualities over the plurality of time instances, and transmit the signal quality measurements as the determined polynomial.

16. The UE (120) according to paragraph 14, wherein the UE (120) is further operative to:

determine, based on the measured signal quality, the number of subsequent measuring occasions in which the measured signal quality has consecutively increased or decreased, and perform the action related to the change of the network configuration when the number of subsequent measuring occasions in which the measured signal quality has consecutively increased or decreased is above a predetermined threshold.

17. The UE (120) according to any of the paragraphs 14 to 16, wherein the UE (120) is further operative to perform one or more of the following actions related to the change of the network configuration:

initiating an inter-frequency handover, initiating an intra-frequency handover, changing handover/reselection parameters.

18. The UE (120) according to any of the paragraphs 14 to 17, wherein the UE (120) is further operative to receive, from the network node (110), an indication to change a network configuration for a future time instance.

Embodiments herein may according to a second example also relate to:

19. A network node (110) for handling signal quality variations for a User Equipment, UE, (120), comprising:

a predicting unit (1410) configured to predict, based on historical data of previous signal quality variations for one or more first UEs (120a) having been served by the network node (110), a future signal quality variation for a second UE (120b) being served by the network node (110), wherein the historical data of previous signal quality variations is indicative of a path of movement of the one or more first UEs (120a), a determining unit (1420) configured to determine to change a network configuration for the second UE (120b) based on the predicted signal quality variation, an initiating unit (1430) configured to initiate the change of the network configuration for the second UE (120b).

20. The network node (110) according to paragraph 19, wherein the network node (110) in order to predict the signal quality variation for the second UE (120b), comprises:

an obtaining unit (1450) configured to obtain information regarding signal quality measurements for a plurality of time instances for the second UE (120b), the determining unit (1420) configured to determine, based on the obtained information regarding signal quality measurements from the second UE (120b), a signal quality of the second UE (120b) at a future time instance using a predictive model generated based on historical data of obtained signal quality measurements indicative of a path of movement for the one or more first UEs (120a).

21. The network node (110) according to paragraph 19 or 20, wherein the network node (110) further comprises:

the obtaining unit (1450) configured to obtain information regarding a plurality of signal quality measurements for different time instances for the one or more first UEs (120a), a generating unit (1470) configured to generate a predictive model for an obtained signal quality measurement from each of the one or more first UEs (120a) at a time instance, based on the obtained signal quality measurements received from each of the one or more first UEs (120a) at one or more previous time instances, wherein the signal quality measurements are indicative of a path of movement of the one or more first UEs (120a).

22. The network node (110) according to paragraph 20 or paragraph 21 when dependent on paragraph 20, wherein the network node (110) comprises the obtaining unit (1450) further configured to obtain the signal quality by receiving, from the one or more first UEs (120a) and/or the second UE (120b), downlink, DL, measurements of the signal quality for each of the one or more first UEs (120a) and/or the second UE (120b).

23. The network node (110) according to paragraph 20 or paragraph 21 when dependent on paragraph 20, wherein the network node (110) comprises the obtaining unit (1450) further configured to obtain the signal quality by performing uplink, UL, measurements of the signal quality for each of the one or more first UEs (120a) and/or the second UE (120b).

24. The network node (110) according to any of the paragraphs 20 to 23, wherein the network node (110) comprises the obtaining unit (1450) further configured to obtain the signal quality measurements for the one or more first UEs (120a) and the second UE (120b) as a polynomial representing the measured signal qualities.

25. The network node (110) according to any of the paragraphs 20 to 23, wherein the network node (110) comprises the obtaining unit (1450) further configured to obtain the signal quality measurements for the one or more first UEs (120a) and the second UE (120b) as a plurality of measurements.

26. The network node (110) according to any of the paragraphs 20 to 23, wherein the network node (110) comprises the obtaining unit (1450) further configured to obtain the signal quality measurements for the one or more first UEs (120a) and the second UE (120b) as a number of subsequent measurement occasions in which the measured signal quality has consecutively increased above a predetermined threshold or decreased below a predetermined threshold.

27. The network node (110) according to any of the paragraphs 20 to 26, wherein the network node comprises the predicting unit (1410) configured to predict the future signal quality variation using a machine learning based model which is trained based on historical data of previous signal quality variations.

28. The network node (110) according to any of the paragraphs 20 to 27, wherein the network node comprises the predicting unit (1410) configured to predict the future signal quality variation using a machine learning based model such as one or more of a:

decision tree model, random forest of decision trees model, neural network, nearest neighbor model, and/or logistic regression model.

29. The network node (110) according to any of the paragraphs 19 to 28, wherein the network node (110) comprises the initiating unit (1430) further configured to initiate the change of the network configuration by sending, to the second UE (120b), an indication to change the network configuration.

30. The network node (110) according to any of the paragraphs 29, wherein the network node (110) comprises the sending unit (1440) configured to indicate to the second UE (120*b*) to change the network configuration for the second UE (120*b*) by:

initiating an inter-frequency handover, initiating an intra-frequency handover, and/or setting handover/reselection parameters.

31. The network node (110) according to any of the paragraphs 19 to 29, wherein the network node (110) comprises the initiating unit (1430) further configured initiate the change of the network configuration by changing a scheduling priority for the second UE (120*b*).

32. A User Equipment, UE, (120) for handling signal quality variations for the UE (120), the UE (120) being configured to:

a measuring unit (1510) configured to measure the signal quality at a plurality of time instances, a transmitting unit (1520) configured to transmit, to a network node (110), information related to the plurality of signal quality measurements at different time instances, wherein the information related to the plurality of signal quality measurements is indicative of an path of movement of the UE (120), a performing unit (1530) configured to perform an action related to a change of the network configuration for a future time instance based on an indication received from the network node (110), wherein the action is dependent on a future signal quality of the UE (120*a*, 120*b*) predicted by the network node (110).

33. The UE (120) according to paragraph 32, wherein the UE (120) further comprises:

a determining unit (1540) configured to determine, based on the measured signal quality, a polynomial representing the measured signal qualities over the plurality of time instances, and the transmitting unit (1520) configured to transmit the signal quality measurements as the determined polynomial.

34. The UE (120) according to paragraph 32, wherein the UE (120) further comprises:

the determining unit (1540) configured to determine, based on the measured signal quality, the number of subsequent measuring occasions in which the measured signal quality has consecutively increased or decreased, and the performing unit (1530) configured to perform the action related to the change of the network configuration when the number of subsequent measuring occasions in which the measured signal quality has consecutively increased or decreased is above a predetermined threshold.

35. The UE (120) according to any of the paragraphs 32 to 34, wherein the UE (120) comprises the performing unit (1530) further configured to perform one or more of the following actions related to the change of the network configuration:

initiating an inter-frequency handover, initiating an intra-frequency handover, changing handover/reselection parameters.

36. The UE (120) according to any of the paragraphs 32 to 35, wherein the UE (120) further comprises:

a receiving unit (1560) configured to receive, from the network node (110), an indication to change a network configuration for a future time instance.

The invention claimed is:

1. A method performed by a network node for handling signal quality variations for a User Equipment, UE, the method comprising:

predicting, a future signal quality variation indicative of a path of movement for a second UE being served by the network node, wherein the predicting is based on historical data of previous signal quality variations for one or more first UEs having been served by the network node, wherein the historical data of previous signal quality variations is indicative of a path of movement of the one or more first UEs, determining to change a network configuration for the second UE based on the predicted signal quality variation, wherein the change comprises initiating an inter-frequency handover, changing a scheduling priority for the second UE by scheduling the second UE for when an expected signal quality is more than a threshold, and configuring the second UE with a plurality of threshold values to be used to scale one or more handover or reselection parameters, the plurality of threshold values comprising:

a first counter indicating a number of successive dropped signal quantity measurements variables, and a second counter indicating an accumulated number of dropped signal quantity measurements during a certain period between resetting the second counter, initiating the change of the network configuration for the second UE.

2. The method according to claim 1, wherein the predicting of the signal quality variation for the second UE comprises:

obtaining information regarding signal quality measurements for a plurality of time instances for the second UE, determining, based on the obtained information regarding signal quality measurements from the second UE, a signal quality of the second UE at a future time instance using a predictive model generated based on obtained signal quality measurements indicative of a path of movement for the one or more first UEs.

3. The method according to claim 2, wherein the signal quality is obtained by receiving, from the one or more first UEs and/or the second UE, downlink, DL, measurements of the signal quality for each of the one or more first UEs and/or the second UE.

4. The method according to claim 2, wherein the signal quality is obtained by performing uplink, UL, measurements of the signal quality for each of the one or more first UEs and/or the second UE.

5. The method according to claim 2, wherein the information regarding signal quality measurements for the one or more first UEs and the second UE are obtained as a plurality of measurements.

6. The method according to claim 2, wherein the information regarding signal quality measurements for the one or more first UEs and the second UE are obtained as a polynomial representing the plurality of measurements.

7. The method according to claim 2, wherein the information regarding signal quality measurements for the one or more first UEs and the second UE are obtained as a number of subsequent measurement occasions in which the measured signal quality has consecutively increased above a predetermined threshold or decreased below a predetermined threshold.

8. The method according to claim 2, wherein the predictive model is a machine learning based model which is trained based on historical data of previous signal quality variations.

9. The method according to claim 8, wherein the machine learning based model is one or a combination of a:

decision tree model, random forest of decision trees model, neural network, nearest neighbor model, and/or logistic regression model.

10. The method according to claim 1, wherein the method further comprises:

obtaining information regarding signal quality measurements for a plurality of time instances for the one or more first UEs, generating a predictive model for an obtained signal quality measurement for each of the one or more first UEs at a time instance, based on the obtained signal quality measurements for each of the one or more first UEs at one or more previous time instances, wherein the signal quality measurements are indicative of a path of movement of the one or more first UEs.

11. The method according to claim 1, wherein initiating the change of the network configuration comprises sending, to the second UE, an indication to change the network configuration.

12. A method performed by a User Equipment, UE, for handling signal quality variations for the UE, the method comprising:

measuring the signal quality at a plurality of time instances, transmitting, to a network node, information related to the plurality of signal quality measurements at different time instances, wherein the information related to the plurality of signal quality measurements is indicative of a path of movement of the UE, performing an action related to a change of a network configuration for a future time instance based on an indication received from the network node, wherein the action is dependent on a future signal quality of the UE predicted by the network node, wherein the change comprises initiating an inter-frequency handover, changing a scheduling priority for the second UE by scheduling the second UE for when an expected signal quality is more than a threshold, and configuring the second UE with a plurality of threshold values to be used to scale one or more handover or reselection parameters, the plurality of threshold values comprising:

a first counter indicating a number of successive dropped signal quantity measurements variables, and a second counter indicating an accumulated number of dropped signal quantity measurements during a certain period between resetting the second counter.

13. The method according to claim 12, wherein the method further comprises:

determining, based on the measured signal quality, a polynomial representing the measured signal qualities over the plurality of time instances, and wherein the transmitting comprises transmitting the signal quality measurements as the determined polynomial.

14. The method according to claim 13, further comprising:

receiving, from the network node, one or more predefined polynomials associated with the predicted signal quality variations;

comparing the determined polynomial to the one or more predefined polynomials; and transmitting a report to the network node when the determined polynomial corresponds to any of the predefined polynomials.

15. The method according to claim 12, wherein the method further comprises:

determining, based on the measured signal quality, the number of subsequent measuring occasions in which the measured signal quality has consecutively increased or decreased, and performing the action related to the change of the network configuration when the number of subsequent measuring occasions in which the measured signal quality has consecutively increased or decreased is above a predetermined threshold.

16. The method according to claim 12, wherein the action performed in initiating an intra-frequency handover.

17. The method according to claim 12, wherein the action performed in step is changing reselection parameters comprising a time parameter associated with cell reselection, wherein the time parameter is adjusted based on a speed dependent scaling factor, and wherein the speed dependent scaling factor comprises at least one of a first scaling factor applied to a medium-mobility state of the second UE, or a second scaling factor applied to a high-mobility state of the second UE.

18. The method according to claim 12, wherein the action performed is adjusting beam failure detection parameters, wherein the beam failure detection parameters comprise a beam FailureInstanceMaxCount and a beamFailureDetectionTimer, wherein the values of the beam failure detection parameters are adjusted according to changes in a radio environment, and wherein a number of allocated resources to the beam failure detection parameters is adjusted according to the changes in the radio environment.

19. A network node for handling signal quality variations for a User Equipment, UE, the network node being configured to:

predict, based on historical data of previous signal quality variations for one or more first UEs having been served by the network node, a future signal quality variation for a second UE being served by the network node, wherein the historical data of previous signal quality variations is indicative of a path of movement of the one or more first UEs, determine to change a network configuration for the second UE based on the predicted signal quality variation, wherein the change comprises initiating an inter-frequency handover, changing a scheduling priority for the second UE by scheduling the second UE for when an expected signal quality is more than a threshold, and configuring the second UE with a plurality of threshold values to be used to scale one or more handover or reselection parameters, the plurality of threshold values comprising:

a first counter indicating a number of successive dropped signal quantity measurements variables, and a second counter indicating an accumulated number of dropped signal quantity measurements during a certain period between resetting the second counter, initiate the change of the network configuration for the second UE.

20. A User Equipment, UE, for handling signal quality variations for the UE, the UE being configured to:

measure the signal quality at a plurality of time instances, transmit, to a network node, information related to the plurality of signal quality measurements at different time instances, wherein the information related to the plurality of signal quality measurements is indicative of a path of movement of the UE, perform an action related to a change of the network configuration for a future time instance based on an indication received from the network node, wherein the action is dependent on a future signal quality of the UE predicted by the network node, wherein the change comprises initiating an inter-frequency handover, changing a scheduling priority for the second UE by scheduling the second UE for when an expected signal quality is more than a threshold; and configuring the second UE with a plurality of threshold values to be used to scale one or more handover or reselection parameters, the plurality of threshold values comprising:

a first counter indicating a number of successive dropped signal quantity measurements variables, and a second counter indicating an accumulated number of dropped signal quantity measurements during a certain period between resetting the second counter.

* * * * *